United States Patent
Nakatani et al.

(10) Patent No.: US 7,981,528 B2
(45) Date of Patent: Jul. 19, 2011

(54) MAGNETIC SHEET WITH STRIPE-ARRANGED MAGNETIC GRAINS, RFID MAGNETIC SHEET, MAGNETIC SHIELDING SHEET AND METHOD OF MANUFACTURING THE SAME

(75) Inventors: Seiichi Nakatani, Osaka (JP); Yoshihisa Yamashita, Kyoto (JP); Takashi Ichiryu, Osaka (JP); Koichi Hirano, Osaka (JP)

(73) Assignee: Panasonic Corporation, Osaka (JP)

( * ) Notice: Subject to any disclaimer, the term of this patent is extended or adjusted under 35 U.S.C. 154(b) by 989 days.

(21) Appl. No.: 11/848,407

(22) Filed: Aug. 31, 2007

(65) Prior Publication Data
US 2008/0070003 A1   Mar. 20, 2008

(30) Foreign Application Priority Data

Sep. 5, 2006   (JP) .................................. 2006-239836
Sep. 19, 2006  (JP) .................................. 2006-252060

(51) Int. Cl.
*B32B 15/00* (2006.01)
(52) U.S. Cl. .................................................. 428/692.1
(58) Field of Classification Search ............... 428/692.1, 428/693.1, 611, 615, 457, 692, 473.5, 195.1, 428/201, 206, 208, 209; 427/128–132, 96.1, 427/286, 287; 340/572.1, 572.6, 572.7, 572.8, 340/5.6; 345/21, 37, 41, 60, 62
See application file for complete search history.

(56) References Cited

U.S. PATENT DOCUMENTS
2004/0140896 A1   7/2004   Ohkawa et al.

FOREIGN PATENT DOCUMENTS
| EP | 1 720 178 | 11/2006 |
|---|---|---|
| JP | 10-41682 | 2/1998 |
| JP | 2000-124662 | 4/2000 |
| JP | 2000124662 A * | 4/2000 |
| JP | 2000-323891 | 11/2000 |
| JP | 2000323891 A * | 11/2000 |
| JP | 2004-227046 | 8/2004 |
| JP | 2005-228908 | 8/2005 |

* cited by examiner

*Primary Examiner* — Holly Rickman
*Assistant Examiner* — Lisa Chau
(74) *Attorney, Agent, or Firm* — Hamre, Schumann, Mueller & Larson, P.C.

(57) ABSTRACT

A water-repelling layer is formed on a resin film, and a stripe pattern region is formed so as to be positioned within a surface region of the water-repelling layer and so as to be relatively hydrophilic with respect to water repellency of the water-repelling layer. A magnetic stripe pattern is formed of needle-shaped magnetic grains oriented and aggregated in the stripe pattern region. The needle-shaped magnetic grains are arranged in a desirable state in a predetermined stripe pattern, with a high magnetic permeability and a magnetic sheet with stripe-arranged magnetic grains that is thin and flexible is obtained.

29 Claims, 16 Drawing Sheets

MAGNETIC SHEET WITH STRIPE-ARRANGED MAGNETIC GRAINS, RFID MAGNETIC SHEET, MAGNETIC SHIELDING SHEET AND METHOD OF MANUFACTURING THE SAME

BACKGROUND OF THE INVENTION

1. Field of the Invention

The present invention relates to a magnetic sheet with stripe-arranged magnetic grains in which magnetic grains are arranged in a predetermined stripe-shaped pattern such as a linear or lattice-shaped pattern. In addition, the present invention relates to an RFID magnetic sheet used in an RFID (Radio Frequency Identification) system and an electromagnetic shielding sheet used in display devices etc., which are application examples thereof.

2. Description of Related Art

Conventionally, there are known applications, such as an RFID magnetic sheet or an electromagnetic shielding sheet, for a thin magnetic sheet in which a magnetic material layer is provided on a flexible substrate.

First, the conventional RFID magnetic sheet will be described. In recent years, it is becoming more common to utilize an RFID system, which is an automatic recognition technology that uses an electromagnetic field of a specific frequency emitted from an external device as a signal carrier, and performs communication of ID (Identification) information and various data with an external device. IC telephone cards, electronic tickets, and electronic money cards are examples of non-contact type IC cards that use an RFID system, and recently this RFID is also being equipped and used in mobile telephones.

In the case of equipping and using an RFID system on a mobile communication apparatus such as a mobile telephone, it is necessary to secure a communication distance, and, because of this, the elimination of influence by magnetic path obstacles is sought. More specifically, there is the drawback that when metal is adjacent to an RFID antenna in the RFID system, communication becomes impossible. In particular, in the case of using an electromagnetic signal of a high frequency such as 13.56 MHz, problems in the RFID system caused by this drawback are significant. In order to solve this problem, it is common to provide the RFID antenna with a magnetic sheet including ferrite with high magnetic permeability. (See, for example, JP 2004-227046A)

FIGS. 1 through 3 will be referred to in describing the problem of not being able to communicate when metal is adjacent to the RFID antenna.

FIG. 1 is a cross-sectional view showing the operation of a typical RFID system 100. In the RFID system 100, an RFID antenna (tag antenna) 102 is attached to an IC tag 101, which is one example of a non-contact type IC card, and to a reader/writer 103 is attached a reader/writer antenna 104. When communicating, the IC tag 101 is positioned close to the reader/writer 103. From the reader/writer antenna 104 of the reader/writer 103 a magnetic flux loop 105 is generated. RFID wireless communication between the IC tag 101 and the reader/writer 103 is made possible by a magnetic flux loop 105a that passes through both antennas (the tag antenna 102 and the reader/writer antenna 104). FIG. 1 shows a schematic view of the communication state in the case where there are no metal products in the vicinity of the IC tag 101.

FIG. 2 schematically shows the communication state in a RFID system 110 like in FIG. 1, in the case where there is a metal product 106 near the IC tag 101. In this case, an eddy current is generated in the metal product 106 positioned in the vicinity of the IC tag 101 by a magnetic field from the reader/writer 103. Further, a magnetic field (demagnetizing field) 107 generated by this eddy current cancels a magnetic flux loop 105b needed for communication. Therefore, communication becomes difficult.

Consequently, when the metal product 106 is adjacent to the IC tag 101, a measure for arranging a magnetic sheet 108 between the IC tag 101 and the metal product 106 is implemented, as shown in FIG. 3. The magnetic sheet 108 includes ferrite with high magnetic permeability, so a magnetic flux loop 105c can be aggregated on the magnetic sheet 108. As a result, it is possible to inhibit the generation of an eddy current in the metal product 106 and improve the communication distance.

The effect of the magnetic sheet 108 will be described in further detail with reference to FIGS. 4A and 4B. First, in the case where there is no magnetic sheet as shown in FIG. 4A, a magnetic flux loop 105d is lost under the influence of a magnetic field (demagnetizing field) that is generated by an eddy current in the metal product 106 that is in the vicinity of the IC tag (IC tag antenna 102) by the magnetic field from the reader/writer. As a result, a magnetic field needed for communication is canceled.

On the other hand, when the magnetic sheet 108 is used as shown in FIG. 4B, a magnetic flux loop 105e is aggregated on the magnetic sheet 108 because the value $\mu'$ (real part) of the magnetic permeability of the magnetic sheet 108 is high. Furthermore, because the $\mu''$ (imaginary part) of the magnetic permeability of the magnetic sheet 108 is low, the magnetic flux loop 105e flows without magnetic loss. As a result, the communication distance can be improved.

However, the magnetic field 108 including ferrite has the following problems. First, in the case of a magnetic sheet in which ferrite is dispersed in a resin, due to the magnetic sheet having a configuration in which magnetic material (ferrite) is dispersed in the resin, there is an upper limit to the effective magnetic permeability $\mu$. In the case of a configuration using a sintered body of ferrite (ceramic) instead of dispersing ferrite in the resin, the effective magnetic permeability $\mu$ increases, but that magnetic sheet becomes brittle because it is a sintered body. Moreover, the magnetic sheet of that sintered body is also limited in how thin or flexible it can be made.

In order to balance flexibility with a high magnetic permeability $\mu$, the present inventor considered using a metal magnetic material as the magnetic sheet. This kind of magnetic sheet has a higher $\mu$ than when ferrite is used, but generates an eddy current because it is electrically conductive. Thus, obstruction of communication results. Therefore, it is realistically difficult to use metal magnetic material as the magnetic sheet.

Next, the conventional electromagnetic shielding sheet will be described. Together with the recent increased use of various electrical equipment and electronic applied equipment, electromagnetic noise interference also is increasing. Noises are classified into conduction noise and radiation noise, and there is a method of using a noise filter as a measure against conduction noise. On the other hand, as a measure against radiation noise, since it is necessary to insulate a space electromagnetically, methods that have been adopted include making the casing of a metal body or a highly conductive body, inserting a metal panel between two circuit boards, or wrapping the cable with metal foil.

These methods can be expected to have an electromagnetic shielding effect in a circuit or power block, but, on the other hand, could not be applied to shielding of electromagnetic waves generated from the front surface of displays such as CRT, PDP, liquid crystal, and EL, because of being opaque.

An EMI shield function of 30 dB or greater at 1 GHz is desired for shielding of electromagnetic waves generated from a display surface, and particularly stringent standards are required to be met for PDP displays which are aimed at family TVs. In addition, good visible light transmittance is desired in the electromagnetic shielding sheet for display. There have been proposed several methods for balancing electromagnetic wave shielding and transparency.

For example, JP H10-41682A discloses an electromagnetic shielding sheet in which a geometrical configuration formed with conductive material is provided on the surface of the transparent plastic base material. JP 2000-323891A discloses an electromagnetic shielding sheet in which an adhesive layer is laminated on transparent base material, and a conductive layer of a geometrical configuration is buried in this adhesive layer. JP 2000-124662A discloses an electromagnetic shielding sheet including a conductive layer formed by applying, on a transparent conductive coating, a coating composition in which chain aggregates of metal microparticles have been dispersed. Typically, types such as a highly transparent film provided with a sputtered metal or a highly transparent film provided with a metal mesh are commonly used.

However, the above-described conventional electromagnetic shielding sheet cannot be said to have sufficient electromagnetic wave shielding properties. In order to solve this problem, the present inventor considered manufacturing an electromagnetic shielding sheet having high magnetic permeability and good electromagnetic wave shielding properties, by arranging a needle-shaped crystal indicating the characteristics of anisotropic soft magnetic material. However, the effect of the anisotropic needle-shaped crystal is reduced remarkably when its arrangement is made random, so there is the need to control the arrangement of the needle-shaped crystal.

SUMMARY OF THE INVENTION

An object of the present invention is to provide a magnetic sheet with stripe-arranged magnetic grains that has a predetermined stripe pattern of needle-shaped magnetic grains arranged in desirable state so as to have a high magnetic permeability, and is manufactured easily.

Another object of the present invention is to use the basic configuration of this type of magnetic sheet with stripe-arranged magnetic grains so as to provide a thin RFID magnetic sheet having a high magnetic permeability and flexibility, or an electromagnetic shielding sheet for attachment to a display and that is balanced in terms of electromagnetic wave shielding property and transparency.

Still another object of the present invention is to provide a manufacturing method of manufacturing these sheets using easy steps and with high performance.

A magnetic sheet with stripe-arranged magnetic grains of the present invention includes: a resin film; a water-repelling layer formed on the resin film; a stripe pattern region that is arranged in a surface region of the water-repelling layer and is relatively hydrophilic with respect to water repellency of the water-repelling layer; and a magnetic stripe pattern formed of needle-shaped magnetic grains oriented and aggregated in the stripe pattern region.

A RFID magnetic sheet of the present invention includes: a plurality of laminated resin films; a water-repelling layer formed on each of the resin films; a stripe pattern region that is arranged in a surface region of the water-repelling layer and is relatively hydrophilic with respect to water repellency of the water-repelling layer; and a magnetic stripe pattern formed of needle-shaped magnetic grains oriented and aggregated in the stripe pattern region; wherein a plurality of the magnetic stripe patterns are formed on each of the resin films so as to be isolated from one another; and the magnetic stripe pattern on each of the resin films is arranged such that each pattern mutually intersects, in a planar shape, with the magnetic stripe pattern on the other resin film.

An electromagnetic shielding sheet of the present invention includes: a resin film; a water-repelling layer formed on the resin film; a stripe pattern region that is arranged in a surface region of the water-repelling layer and is relatively hydrophilic with respect to water repellency of the water-repelling layer; and a magnetic stripe pattern formed of needle-shaped magnetic grains oriented and aggregated in the stripe pattern region, wherein the stripe pattern region is a lattice-shaped pattern region formed into a lattice shape, and a magnetic lattice-shaped pattern is formed of needle-shaped magnetic grains oriented and aggregated in the lattice-shaped pattern region.

A method of manufacturing a magnetic sheet with stripe-arranged magnetic grains of the present invention includes: a step (a) of forming, on a resin film, a water-repelling layer, and a stripe pattern region that is positioned within a surface region of the water-repelling layer and is relatively hydrophilic with respect to water repellency of the water-repelling layer; and a step (b) of providing a solution containing the needle-shaped magnetic grains to the stripe pattern region to form a magnetic stripe pattern of needle-shaped magnetic grains oriented and aggregated in the stripe pattern region.

A method of manufacturing a RFID magnetic sheet of the present invention includes: a step (a) of forming, on a resin film, a water-repelling layer and a stripe pattern region that is positioned within a surface region of the water-repelling layer and is relatively hydrophilic with respect to water repellency of the water-repelling layer; a step (b) of providing a solution containing needle-shaped magnetic grains to the stripe pattern region formed on the resin film to form a magnetic stripe pattern by orienting and aggregating the needle-shaped magnetic grains in the stripe pattern region; and a step (c) of laminating the resin film on which the magnetic stripe pattern has been formed, wherein in the step (a), a plurality of the stripe pattern regions are formed such that each is isolated from one another; and in the step (c), the magnetic stripe pattern on each of the resin films is arranged such that each pattern mutually intersects, in a planner shape, with the magnetic stripe pattern on the other resin films.

A method of manufacturing an electromagnetic shielding sheet of the present invention includes: a step (a) of forming, on a resin film, a water-repelling layer and a stripe pattern region that is positioned within a surface region of the water-repelling layer and is relatively hydrophilic with respect to water repellency of the water-repelling layer; and a step (b) of providing a solution containing needle-shaped magnetic grains to the stripe pattern region formed on the resin film to form a magnetic stripe pattern by orienting and aggregating the needle-shaped magnetic grains in the stripe pattern region, wherein in the step (a), the stripe pattern region is formed into a lattice shape, and in the step (b), the magnetic lattice-shaped pattern is formed by orienting and aggregating the needle-shaped magnetic grains in the lattice-shaped stripe pattern region.

DETAILED DESCRIPTION OF THE INVENTION

Figure 1:
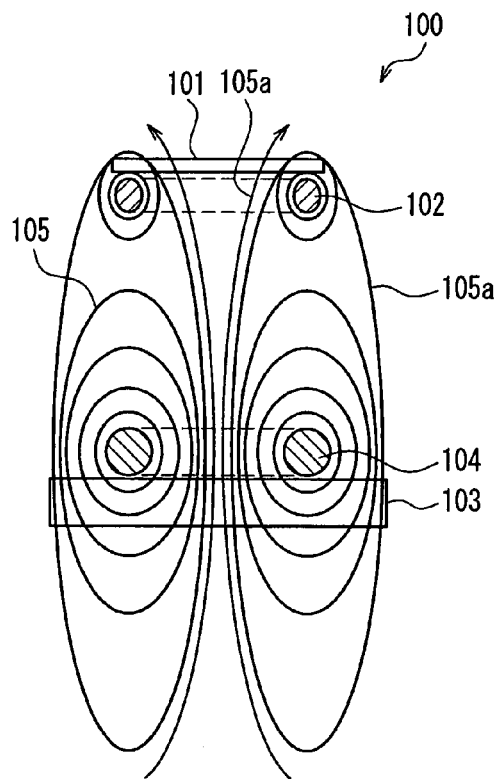
FIG. 1 is a cross-sectional view showing a communication state in an RFID system.
Figure 2:
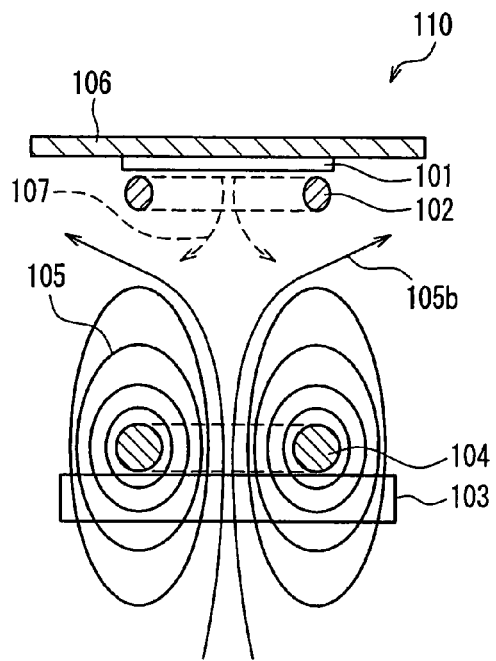
FIG. 2 is a cross-sectional view showing the communication state in the RFID system.
Figure 3:
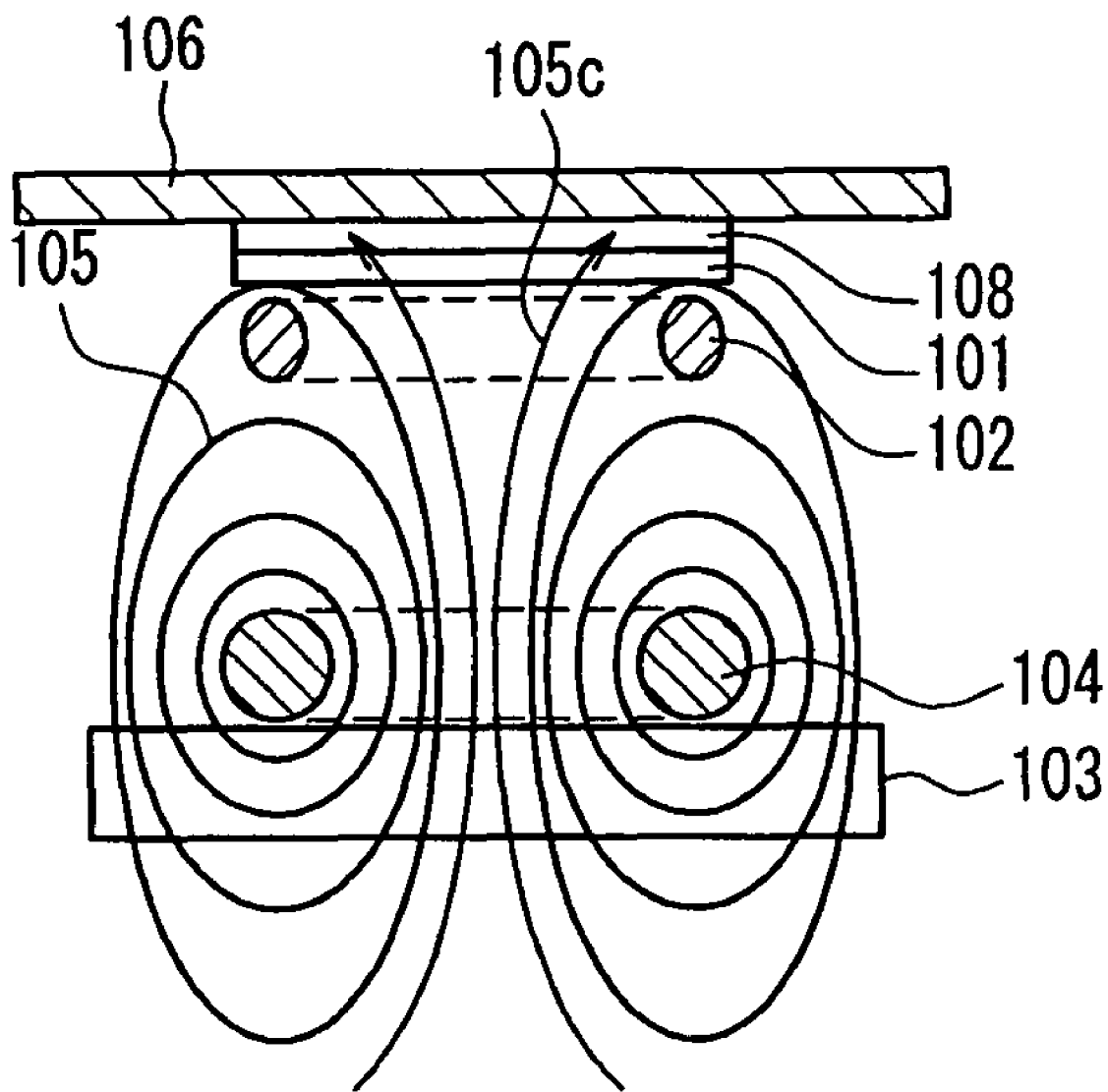
FIG. 3 is a cross-sectional view showing an effect of a magnetic sheet in the RFID system.
Figure 4A:
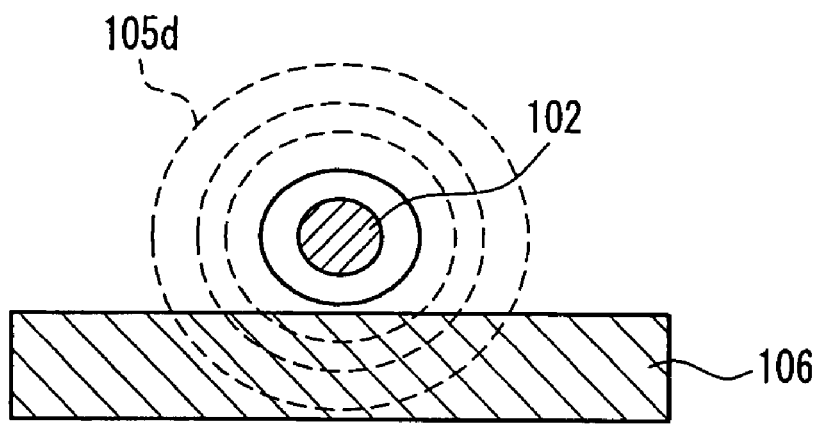
FIG. 4A is a cross-sectional view showing an operation during communication in a state lacking the magnetic sheet.
Figure 4B:
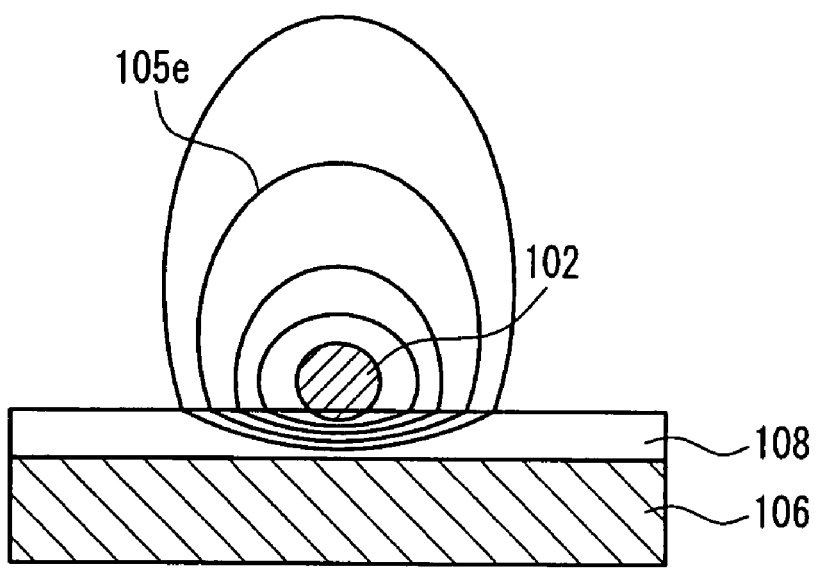
FIG. 4B is a cross-sectional view showing in detail an effect of the magnetic sheet.

According to the magnetic sheet with stripe-arranged magnetic grains of the present invention, it is possible to obtain easily a high magnetic permeability because a stripe pattern region relatively having hydrophilicity with respect to the water repellency of a water-repelling layer is arranged in a surface region of the water-repelling layer formed on the resin film, and needle-shaped magnetic grains are oriented and aggregated in that stripe pattern region. Because the stripe pattern region is a relatively hydrophilic region, it is possible to orient easily the needle-shaped magnetic grains by aggregating the needle-shaped magnetic grains in the hydrophilic region using surface tension.

The configuration of the magnetic sheet with stripe-arranged magnetic grains of the present invention is particularly effective in the case that it is applied to an RFID magnetic sheet. That is, the RFID magnetic sheet of the present invention focuses on a metal magnetic material that has an adverse influence due to an eddy current resulting from its conductiveness, conceives a configuration for eliminating the obstacles related to use, and secures a high magnetic permeability, thereby realizing a thin RFID magnetic sheet having high flexibility. In order to solve the problem of the eddy current, the present invention avoids the influence from the generation of the eddy current by making the needle-shaped magnetic grains a magnetic stripe. Further, by laminating the magnetic stripe and creating a lattice-shaped pattern, passage of the magnetic flux loop is made easier.

Also, the electromagnetic shielding sheet of the present invention achieves a good electromagnetic wave shielding property having a high magnetic permeability by arranging needle-shaped magnetic grains having characteristics of an anisotropic soft magnetic material rather than an isotropic magnetic material. Because the effect of an anisotropic soft magnetic material decreases remarkably when the arrangement is made random, it is necessary to control the arrangement of the needle-shaped magnetic grains. The present inventor achieved the electromagnetic shielding sheet of the present invention by discovering how to arrange and aggregate needle-shaped crystals by surface tension in a hydrophilic lattice-shaped pattern.

The present invention, which has the above-described basic configuration, may be applied in various variations described below.

That is, in the magnetic sheet with stripe-arranged magnetic grains of the present invention having the above-described configuration, the stripe pattern region may be a region where the water-repelling layer is absent to form a stripe state in a planar shape.

The needle-shaped magnetic grains may be fixed in a state in which the needle-shaped magnetic grains are aggregated in the hydrophilic region by the effect of surface tension.

It is preferable that the hydrophilic region forming the stripe-shaped pattern region has a width narrower than a length of the length direction of the needle-shaped magnetic grains.

The needle-shaped magnetic grain may be made from an anisotropic soft magnetic metal material.

The needle-shaped magnetic grain may be made from an alloy including at least one element selected from the group consisting of Fe, Ni, and Co.

The magnetic stripe pattern may includes the needle-shaped magnetic grains and an organic binder. The resin film may be aramid resin or polyimide resin.

In the RFID magnetic sheet of the present invention of the above-described configuration, a lattice pattern may be formed with the magnetic stripe patterns extending along a first direction and the magnetic stripe patterns extending along a second direction, which are formed on the respective resin films of layers different from one another.

Also, the RFID magnetic sheet further may include a resin film on which is formed a magnetic stripe pattern extending along a third direction that differs from the first and second directions.

A non-contact type IC card may be composed of an RFID magnetic sheet of the above arrangement, an RFID antenna coil positioned adjacent to the RFID magnetic sheet, and an IC chip connected to the RFID antenna coil.

Further, a mobile communication device may be composed of the RFID magnetic sheet according to claim 9; an antenna coil for RFID use, arranged adjacent to the RFID magnetic sheet; and an IC chip connected to the antenna coil for RFID use.

In the electromagnetic shielding sheet of the present invention having the above configuration, the needle-shaped magnetic grain may be an iron metal magnetic grain or a ferrite magnetic grain.

It is preferable that the resin film is made of translucent resin.

A flat panel display may be configured by attaching the electromagnetic shielding sheet of the above configuration to the front surface of a display panel. The display panel may be a plasma display panel.

In the method of manufacturing a magnetic sheet with stripe-arranged magnetic grains of the above configuration of the present invention, the stripe pattern region may be a region where the resin film is exposed so as to be surrounded by the water-repelling layer.

Further, the step (a) may include a step of forming, on the resin film, a water-repelling layer having a water-repellent property against the solution in the step (b); and a step of forming a hydrophilic region by exposing the water-repelling layer by using a mask defining the stripe pattern region.

Further, the step (a) may include a step of forming a hydrophilic region by exposing, using a mask defining the stripe pattern region, a film having a surface that is changeable to be hydrophilic with an exposure.

Further, the step (b) may include a step of providing a solution on top of the resin film on which the stripe pattern region has been formed; and a step of introducing the needle-shaped magnetic grains to the solution provided on the resin film.

Also, the step (b) may include a step of dispersing the needle-shaped magnetic grains in the solution; and a step of applying, on the resin film, the solution in which the needle-shaped magnetic grains have been dispersed.

In the step (b), it is preferable that the needle-shaped magnetic grains is arranged in the stripe pattern region by surface tension of the solution.

After the step (b), a step of transferring the magnetic stripe pattern to another film may be included.

The steps (a) and (b) can be executed successively in a roll-to-roll method.

In the method of manufacturing a RFID magnetic sheet of the above configuration of the present invention, in a planar shape of a laminated body of the resin films, the laminated body may be formed such that a lattice pattern is formed with the magnetic stripe pattern extending along a first direction and the magnetic stripe pattern extending along a second direction.

Embodiments of the present invention will be described below with reference to the drawings. The embodiments below are related to the case of an RFID magnetic sheet and an electromagnetic shielding sheet, but, in essence, the configuration of the magnetic sheet with stripe-arranged magnetic grains of the present invention and manufacturing method thereof, which are more general, are included. In the drawings below, in order to simplify descriptions, structural elements that have essentially the same functions are given the same reference numerals, and their descriptions are not repeated. Note that the present invention is not limited to the embodiments below.

First Embodiment

A RFID magnetic sheet according to a first embodiment of the present invention will be described with reference to FIGS. 5A and 5B as well as FIGS. 6A and 6B.

Figure 5A:
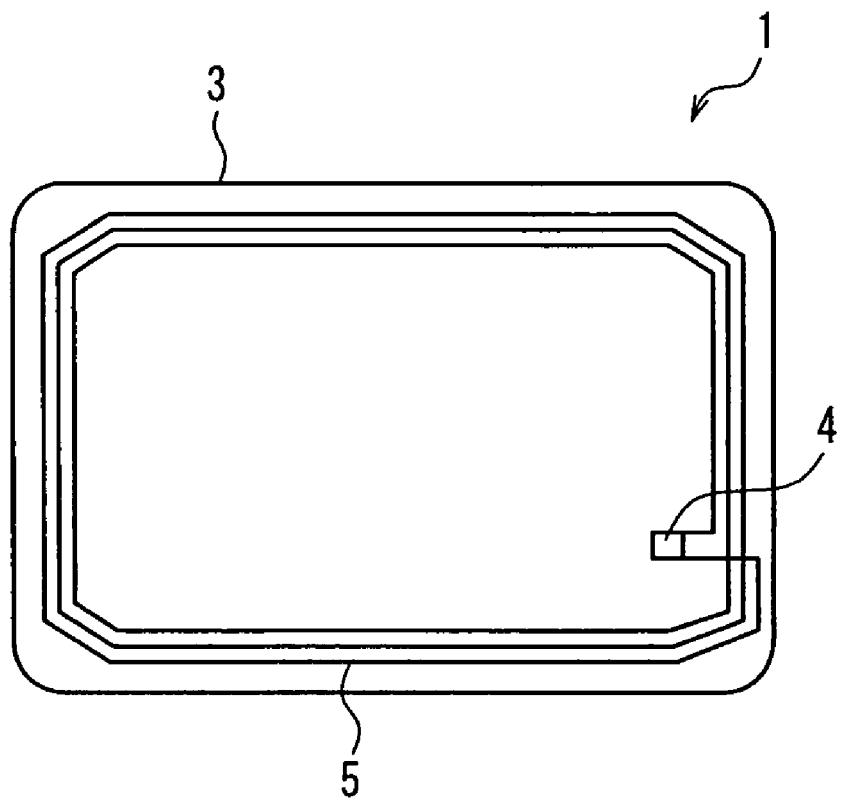
FIG. 5A is a plan view schematically showing a top surface configuration of an IC tag.
Figure 5B:
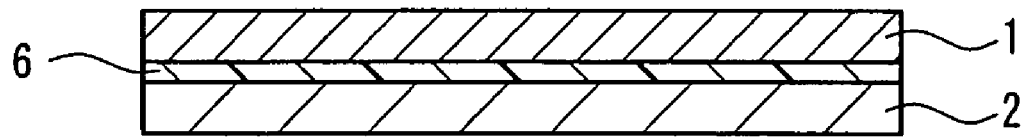
FIG. 5B is a cross-sectional view schematically showing a cross-sectional configuration of an RFID magnetic sheet attached to the IC tag.

FIG. 5A schematically shows a top surface configuration of an IC tag 1 in which the RFID magnetic sheet of the present embodiment has been used. FIG. 5B schematically shows the cross-sectional configuration in the state in which an RFID magnetic sheet 2 has been attached to the IC tag 1.

The IC tag 1 includes a card 3 that is the base substance, an IC chip 4 arranged on the card 3, and a coil antenna (antenna coil for RFID use) 5 connected electrically to the IC chip 4. This IC tag 1 is used as a non-contact type IC card, a unique ID number is stored in the memory of the IC chip 4, and it is possible to store various information in that memory. The IC chip 4 has a built-in CPU and memory, and can perform code processing, authentication, and storage.

The RFID magnetic sheet 2 of the present embodiment is attached to the card 3 of the IC tag 1. Another layer may exist between the card 3 and the magnetic sheet 2, and, for example, an adhesion layer 6 can be provided as shown in FIG. 5B.

Figure 6A:
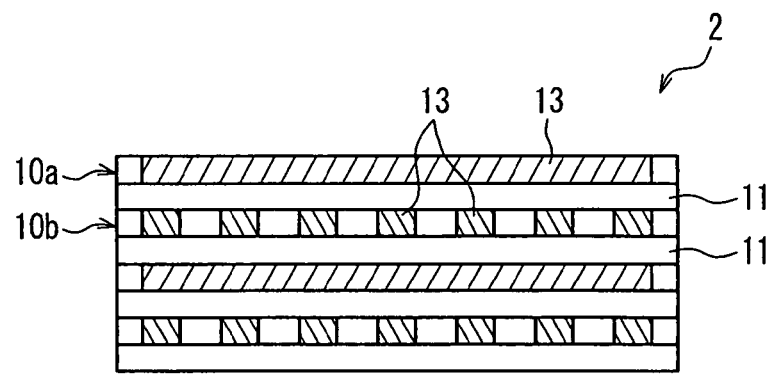
FIG. 6A is a cross-sectional view schematically showing the configuration of the RFID magnetic sheet according to a first embodiment of the present invention.

FIG. 6A schematically shows the cross-sectional configuration of the RFID magnetic sheet 2. FIG. 6B is a perspective view showing the magnetic sheet 2 in exploded state. The magnetic sheet 2 has a structure in which magnetic stripe sheets 10a and 10b are alternately laminated. Each of the magnetic stripe sheets 10a and 10b comprises a resin film 11, a water-repelling layer 12 formed on the resin film 11, and a magnetic stripe 13 made of needle-shaped magnetic grains formed within the surface region of the water-repelling layer 12. Note that, with respect to the resin film 11 in the figures, the hatching of the cross-section is omitted for making it easier to see.

In this structure, each of the plurality of magnetic stripes 13 in each of the layers of the magnetic stripe sheet 10a and 10b, are arranged separately from one another and so are insulated electrically. In addition, the magnetic stripe 13 arranged on each of the magnetic stripe sheets 10a and 10b, which are positioned one on top of the other, are separated from each other between the respective layers by the resin film 11 and so are insulated electrically.

Figure 6B:
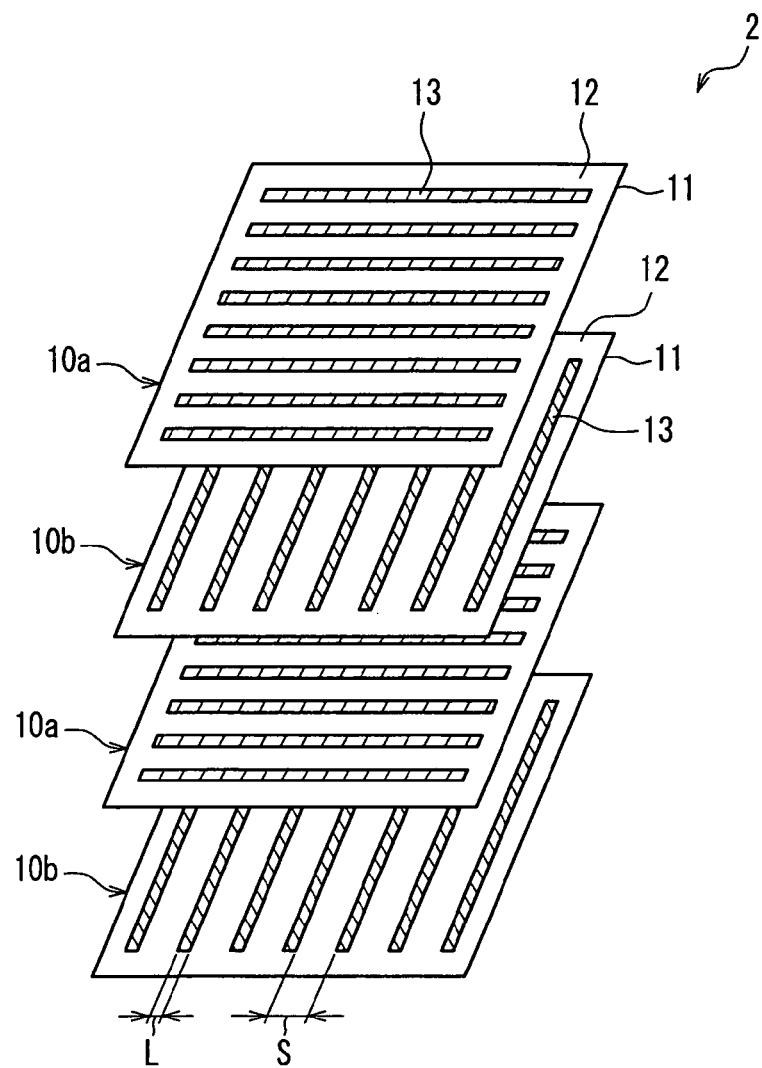
FIG. 6B is an exploded perspective view of the same RFID magnetic sheet.

With the layer structure of FIGS. 6A and 6B, a lattice-shaped pattern is formed as a planar shape by the combination of the magnetic stripe sheet 10a on which the magnetic stripe 13 is arranged in a row pattern, and the magnetic stripe sheet 10b on which the magnetic stripe 13 is arranged in a column pattern. Note that the magnetic stripe sheet 10a and the magnetic stripe sheet 10b differ only in the direction of the arrangement of the magnetic stripe 13. The material and structure are the same member. Therefore, in the case of collectively referring to these magnetic stripe sheets below, they will be called magnetic stripe sheet 10, with the reference numeral simply being "10".

Figure 7:
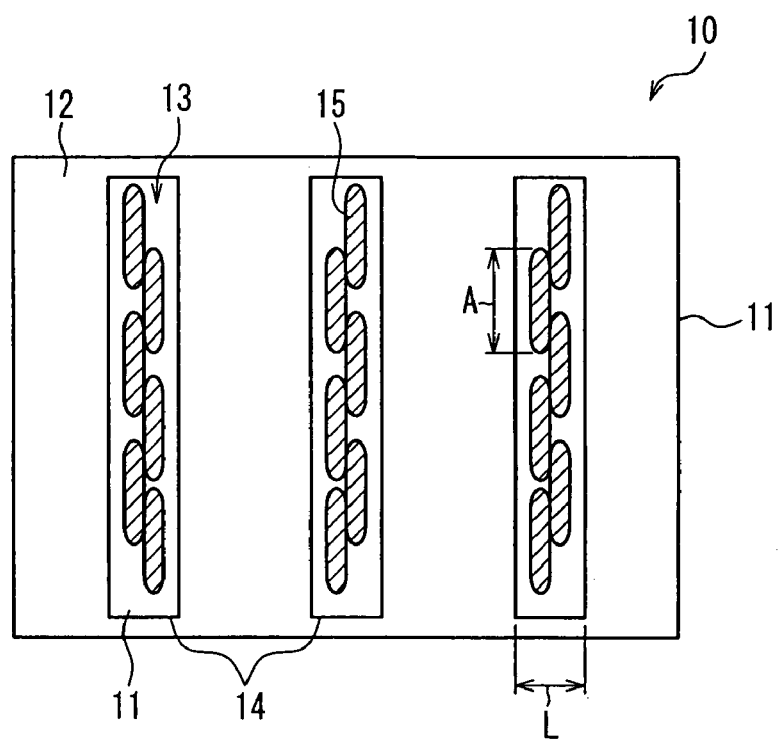
FIG. 7 is a top view schematically showing the configuration of the resin film on which a pattern of a water-repelling layer is formed.

FIG. 7 is a view schematically showing the top surface configuration, in the magnetic stripe sheet 10, of the resin film 11 on which the water-repelling layer 12 is formed.

On the resin film 11 a stripe pattern constituted is composed of a plurality of stripe-shaped regions (stripe regions) 14, which is formed of an exposed portion of the resin film 11 due to lack of the water-repelling layer 12. Needle-shaped magnetic grains 15 are oriented and aggregated in these stripe regions 14 so as to form the magnetic stripe 13.

The needle-shaped magnetic grains 15 of the present embodiment may be constituted with an anisotropic soft magnetic metal material, and, as such a material, an iron metal magnetic grain can be given. Specifically, it is possible to use needle-shaped metal powder such as, for example, Fe, Fe—Al—Si, and Fe—Ni. In addition, the needle-shaped magnetic grain 15 may be a magnetic grain including at least one element selected from the group consisting of Fe, Ni, and Co (e.g., an alloy including these elements). Here, the case of using Fe—Ni metal magnetic powder (needle-shaped crystals of particle size diameter 10 µm-20 µm, and particle length 50 µm-100 µm) as the needle-shaped magnetic grain 15 will be described.

The stripe regions 14 are regions that are hydrophilic relatively to the water-repelling property of the water-repelling layer 12. The needle-shaped magnetic grains 15 are oriented and aggregated in the stripe regions 14 by the effect of surface tension in the manufacturing step as described below. It is preferable, for purposes of arranging and aggregating of the needle-shaped magnetic grains 15, that the width L of the stripe regions 14 is narrower than the length A of the length direction of the needle-shaped magnetic grains 15. Moreover, as schematically shown in FIG. 7, the needle-shaped magnetic grains 15 in the present embodiment are oriented so that the length direction of the needle-shaped magnetic grain 15 is aligned with the length direction of the stripe regions 14.

The length A of the length direction of the needle-shaped magnetic grain 15 is, for example, 100 µm or greater (one example is 50 µm-200 µm). The length A of the length direction of the needle-shaped magnetic grains 15 may be the average value (average crystal particle diameter of the length direction) of the plurality of needle-shaped magnetic grains 15. Therefore, there may exist individual needle-shaped magnetic grains 15 whose length A in the length direction of the needle-shaped magnetic grain 15 is shorter than the width L of the stripe region 14.

Note that orientation of the needle-shaped magnetic grains 15 along the hydrophilic stripe region 14, the relationship between the hydrophilic and water-repelling properties with respect to a certain solution, and the effect of surface tension, will be stated below in the description of the manufacturing method of the RFID magnetic sheet 2.

The width L (line) of the stripe region 14 (fine line) may be determined appropriately according to the type of the needle-shaped magnetic grains 15 that is used, as well as on the performance required of the RFID magnetic sheet 2. For example, it may be 0.5 mm or less (50 µm-300 µm as one example). The space S between the stripe region 14 (fine line) may be, for example, 0.5 mm or less (50 µm-300 µm as one example). The fine line and space may be set according to the various use conditions.

Here, in the case where the needle-shaped magnetic grain 15 has electrical conductivity, the generated eddy current becomes easier to flow as the width L (line) of the stripe region 14 (fine line) becomes bigger, and the generation of the eddy current is inhibited as L becomes smaller. Therefore, the width L is correlated with the eddy current, and so the setting thereof is such that the eddy current is inhibited, and the narrower L is, the better. Actually, when the processing limit and processing accuracy of the stripe region 14 are considered, it is desirable to set to, for example, 20 µm-300 µm.

Also, with respect to the space S (space) of the stripe region 14 (fine line), as S becomes bigger, the magnetic flux (actually the electromagnetic wave that exists together with the electrical wave and whose frequency is changing) becomes more leaky, and as S becomes smaller, the leaking of the magnetic flux can be prevented. Therefore, the space S is correlated with the leaking (shield effect) of the electromagnetic wave, and is set to inhibit leaking, so the smaller S is, the better. Actually, when the processing limit and processing accuracy of the stripe region 14 are considered, it is desirable to set to, for example, 50 µm-300 µm.

This means that, when considering the inhibition of the eddy current and the electromagnetic wave leakage, it is better for the width L and the space S to be as small as possible. This means that the higher the density of the fine lines, the better, and consequently, this leads to an increase in the amount of magnetic grains per unit volume. As a result, this means that it is possible to realize a magnetic sheet with a high net magnetic permeability.

Typically, the magnetic strips 13 cross at an angle of 90° between the magnetic stripe sheet 10a of the row pattern and the magnetic stripe sheet 10b of the column pattern, but the crossing does not necessarily have to occur at 90°. For example, it is possible to form a lattice-shaped pattern of the magnetic stripe by crossing at an angle such as 60° or 45°. Also, it is possible to superimpose a magnetic stripe sheet of yet another pattern on the magnetic stripe sheet 10a of the row pattern and the magnetic stripe sheet 10b of the column pattern.

In essence, the lattice-shaped pattern formed by the laminated structure of the magnetic stripe sheet is obtained by arranging the magnetic stripe sheets such that the magnetic stripe in each of the magnetic stripe sheets intersects in the planar shape with the magnetic stripe in the other magnetic stripe sheets. It is necessary to realize the function of making the passage of the magnetic flux loop easy by doing as above.

In the example shown in FIG. 6A, the magnetic stripe sheets 10a and 10b are each formed on the resin film 11, but it is possible to make other layers (e.g., adhesive layers) exist on the resin film 11 and the magnetic stripe sheets 10a and 10b. In addition, it is possible to form the magnetic stripe inside the resin film 11. In any case, it is desirable that the space between the magnetic stripe sheet 10 of each layer be arranged to be insulated electrically.

The resin film 11 can be selected as appropriate based on the use, performance, and conditions. For example, aramid resin film, polyimide resin film, polyethylene terephthalate resin film, polyethelene naphthalate resin film, etc., may be used. As it is possible to obtain an aramid resin film having a high heat tolerance and that is thin (e.g., 3 µm or less), there are cases where it is preferable to use aramid resin film in view of thinness when the number of layers is considered.

The thickness of the resin film (insulating film) 11 of the present embodiment may be, for example, 4 µm or greater. In order to laminate the films ultimately, if the thickness of the film 11 is low, there is the merit of being able to make the thickness of the RFID magnetic sheet 2 thinner. The film 11 of the present embodiment may be aramid resin or polyimide resin.

As described above, in the RFID magnetic sheet 2 of the present embodiment, the stripe pattern is formed by the hydrophilic stripe region 14 that is a region exposed from the water-repelling layer 12 formed on the resin film 11, and by orienting and aggregating the needle-shaped magnetic grains 15 in that stripe region 14, the magnetic stripe 13 is formed. Because the needle-shaped magnetic grains 15 are oriented and aggregated in the stripe region 14 formed in the resin film 11, the RFID magnetic sheet 2 is formed to be thin and flexible compared to a ceramic sintered body (e.g., ferrite). And, the stripe region 14 is relatively hydrophilic compared to the water-repelling layer 12, so that the arrangement of the needle-shaped magnetic grains 15 can be obtained by taking advantage of the surface tension to aggregate the needle-shaped magnetic grains 15 on the hydrophilic region. By taking advantage of surface tension, the arrangement of the needle-shaped magnetic grains 15 can be carried out by self-alignment without using the manufacturing device for controlling each particle of the magnetic grains.

In the case where the needle-shaped magnetic grain 15 is an anisotropic soft magnetic metal material, it is possible to obtain an RFID magnetic sheet 2 having a high magnetic permeability, and also it is possible to inhibit the generation of an eddy current because the needle-shaped magnetic grains 15 made of that soft magnetic metal material are arranged inside the stripe region 14 of each of the resin films 11, even if that metal material is electrically conductive. In addition, in the configuration of the present embodiment, in the laminated body of the magnetic stripe sheet 10, since the lattice pattern is formed by the combination of the row pattern and the column pattern, the metal magnetic material is positioned in the stripe region 14 of each individual fine line (strip) separated from one another. For this reason, even if an eddy current is generated because of the electrical conductivity of the metal magnetic material, the influence of that eddy current is sufficiently suppressed. Here, if the effect of making small the leakage of magnetic field is remarkably higher than the effect of the demagnetizing field caused by the eddy current, improvement of communication distance can be achieved.

Further, as described above, the RFID magnetic sheet 2 of the present embodiment can be made thinner compared to a ceramic magnetic material (ferrite), and can be used for making items of high flexibility. Therefore, the RFID magnetic sheet 2 of the present embodiment is suitable as a non-contact type IC card (specifically, those that are built into a mobile phone).

Next, an example of a step to manufacture a magnetic stripe sheet that is a part of the manufacturing method of the RFID magnetic sheet 2 in the present embodiment will be described with reference to FIGS. 8A through 8D.

Figure 8A:
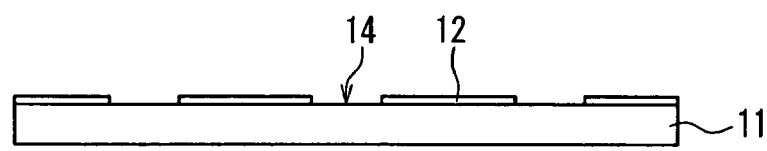
FIG. 8A is a cross-sectional view describing a step of a manufacturing method of a magnetic stripe sheet that is a part of a manufacturing method of the RFID magnetic sheet according to the first embodiment.

First, as shown in FIG. 8A, a pattern of the hydrophilic stripe region 14 surrounded by the water-repelling layer 12 is formed on the resin film 11. That is, the pattern of the water-repelling layer 12 is formed by except for the hydrophilic stripe region 14 that is a droplet formation region.

In the present embodiment, the water-repelling layer 12 is formed in order to surely and simply form a droplet on the predetermined location (stripe region 14) on the resin film 11. The water-repelling layer 12 is made, for example, of photosensitive water-repelling oil-repelling resin. One embodiment of the water-repelling layer 12 of the present embodiment is made of a resist membrane of a UV hardening type manufactured by NIPPON PAINT Co., Ltd. This material is made of silicone and acrylic block polymer. In more detail, it has the structure of a sea-island structure (silicone island) of silicone and acrylic. Here, silicone has a low surface tension characteristic, and acrylic has the roles of controlling resin alteration, hardness, adhesiveness, and UV hardening property. The contact angle between the formed water-repelling membrane and water is 100° to 105°, and with respect to the water formed on the water-repelling membrane, the descent angle measured by inclining the water-repelling membrane is 20° to 40°. On the other hand, the wetting ability of the water of the part from which the water-repelling membrane is absent, shows a contact angle with water at 40° to 45°.

The hydrophilic stripe region 14 surrounded by the water-repelling layer 12 can be formed, for example, as follows. First, a water-repelling material is applied to the entire surface of the resin film 11. Specifically, a spin coat is used and applied in a thickness of 1-2 μm. Next, after pre-baking the applied material (120° C. for 30 minutes), the hydrophilic stripe region 14 is exposed using the mask defining the hydrophilic stripe region 14 so as to be the predetermined pattern. The exposure can be performed at 300 mj/cm$^2$ using UV. Next, baking is performed at 120° C. for 30 minutes, and by immersion for 1-2 minutes in toluene, development is performed. Finally, by performing post-baking at 120° C. for 10 minutes, the water-repelling layer 12 can be obtained.

Note that when fluoride/acrylic block polymer of Asahi Glass Co., Ltd., is used as a photosensitive, water-repelling, oil-repelling resin, the hydrophilic stripe region 14 surrounded by the water-repelling, oil-repelling water-repelling layer 12 can be formed at the photolithography step at the i line.

Figure 8B:
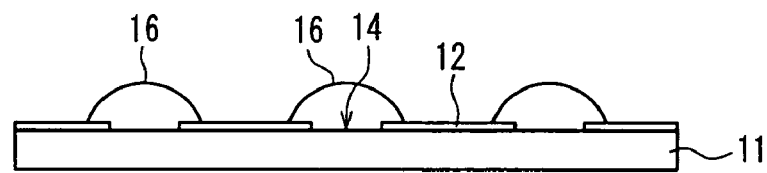
FIG. 8B is a cross-sectional view describing a step following the step of FIG. 8A of the same manufacturing method.

Next, as shown in FIG. 8B, a droplet 16 is formed on the resin film 11 subjected to the water-repelling processing. The formation of the droplet 16 can be performed by, for example, misting the entire resin film 11 with the fluid for the droplet 16 using a spray. By doing so, the droplet 16 is formed on the hydrophilic stripe region 14 surrounded by the water-repelling layer 12. Note that, here, "hydrophilic" or "hydrophobic" refer to the property of the fluid comprising the droplet 16. Typically, affinity for water is called "hydrophilicity", while poor affinity for water is called "hydrophobicity". When the fluid comprising the droplet 16 is a fluid other than water, a determination should be made based on the affinity with respect to that fluid. Therefore, when the droplet 16 is a fluid other than water, there is the case where the phrases "lyophilic" or "lyophobic" can be used. However, in the present specification, in order to make the expression simple, the phrases "hydrophilic" and "hydrophobic" will be used in description.

Figure 8C:
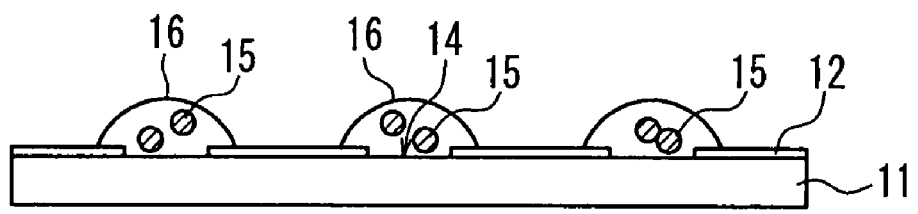
FIG. 8C is a cross-sectional view describing a step following the step of FIG. 8B of the same manufacturing method.
Figure 8D:
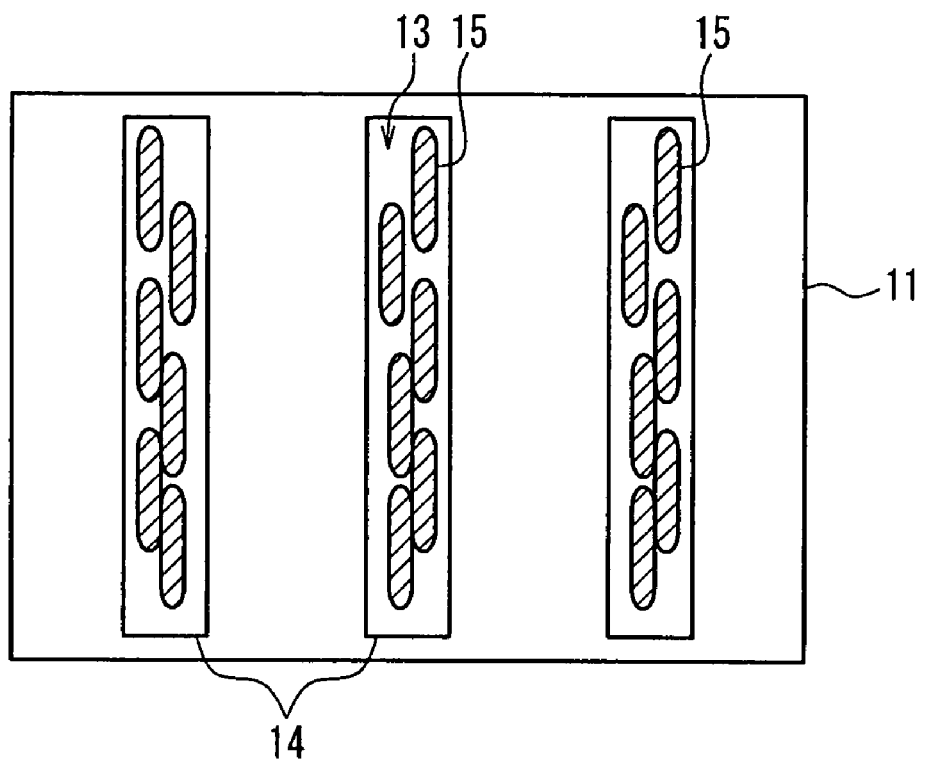
FIG. 8D is a plan view corresponding to FIG. 8C.

When the needle-shaped magnetic grains 15 are introduced in the droplet 16 after the droplet 16 is formed in the stripe region 14 surrounded by the water-repelling layer 12, the needle-shaped magnetic grains 15 are oriented in the hydrophilic stripe region 14, and the magnetic stripe 13 made of magnetic material is formed, as shown in FIGS. 8C and 8D. Note that in FIG. 8D, diagrammatic representation of the droplet 16 is omitted.

Figure 9:
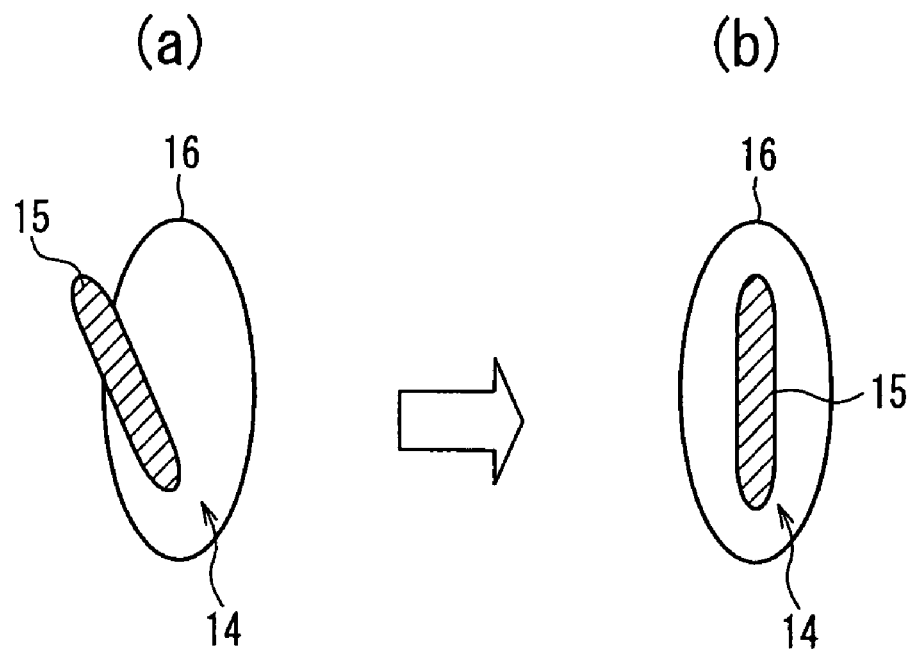
FIG. 9 are top views for describing orienting, in a self-aligning manner, of needle-shaped magnetic grains by surface tension.

As shown in FIG. 9(a), when the needle-shaped magnetic grains 15 are introduced to the droplet 16 provided to vertically long, hydrophilic stripe regions 14, the length direction of the needle-shaped magnetic grain 15, as shown in FIG. 9(b), moves (rotates) so as to be aligned in the vertically long direction of the stripe region 14 by the surface tension effect of the droplet 16. Through this, the orientation of the needle-shaped magnetic grains 15 can be performed in a self-aligning manner. In the case where the needle-shaped magnetic grain 15 is an anisotropic soft-magnetic material, it is possible to increase the magnetic permeability of the magnetic sheet remarkably compared to the case of random arrangement, by the self-aligning orientation of each of the length directions of the needle-shaped magnetic grains 15.

In order to self-align the orientation of the needle-shaped magnetic grains, it is preferable to process the surface of the needle-shaped magnetic grains and increase its surface energy, and increase the hydrophilicity. For example, it is possible to increase the hydrophilicity by irradiating, on the surface of the needle-shaped magnetic grains, ultraviolet light in the ozone atmosphere. By subjecting the magnetic grains to hydrophilic processing, it is possible to aggregate the needle-shaped magnetic grains with increased reliability, and to form a magnetic membrane with increased precision.

In addition, by forming a hydrophilic thin membrane (e.g., hydrophilic membrane) on the surface of the needle-shaped magnetic grains, it is possible to increase the hydrophilicity of the needle-shaped magnetic grains. For example, thin membranes of silicon oxide, nitric oxide, and oxidized titanium can be formed on the surface of the needle-shaped magnetic grains by vacuum sputtering or heat CVD. After forming these thin membranes, it is effective to irradiate ultraviolet light in ozone atmosphere. Also, by modifying the surface of the needle-shaped magnetic grains by a silane coupling agent having a terminal amino group, carboxyl group or hydroxyl group, it is possible to increase the hydrophilicity. In the case of surface processing on only metal, the surface may be modified with a thiol group having a terminal amino group, carboxyl group or hydroxyl group.

Figure 10:
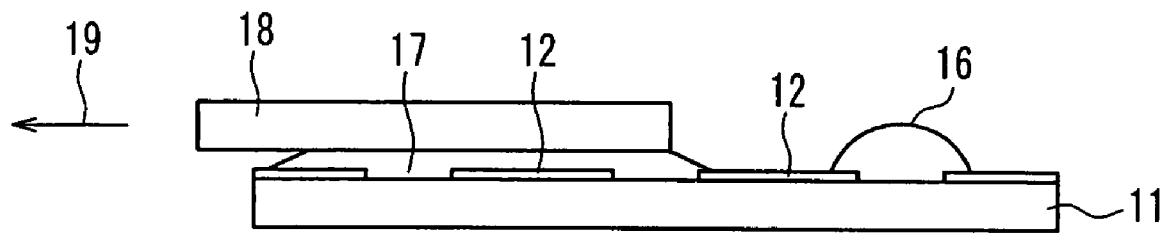
FIG. 10 is a step cross-sectional view for describing another example of a manufacturing method of the RFID magnetic sheet according to the first embodiment.

Note that it is possible to form the droplet 16 shown in FIG. 8B not by dispersal as a mist by spray, but to be as shown in FIG. 10. First, a fluid 17 for the droplet 16 is dropped on the entire surface of the resin film 11, and, following this, the slide board (e.g., slide glass) 18 is pressed on. After the fluid covers the entire surface of the resin film 11, by sliding the slide board 18 with the predetermined gap (see arrow 19), the droplet 16 is formed in the region (stripe region 14) surrounded by the water-repelling layer 12.

Figure 11A:
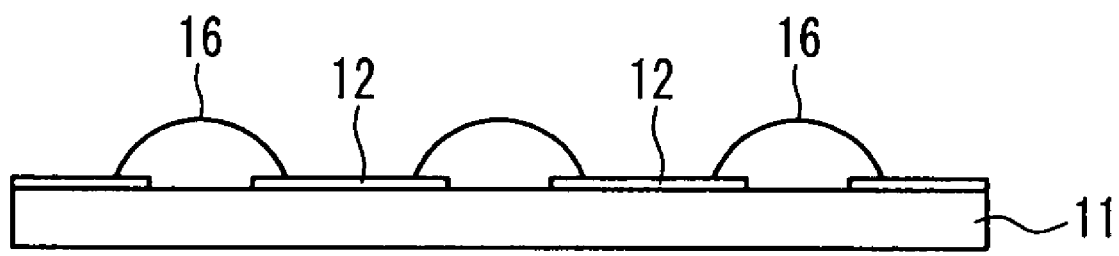
FIG. 11A is a cross-sectional view for describing a step of introducing needle-shaped magnetic grains to a droplet in the manufacturing method of the RFID magnetic sheet.
Figure 11B:
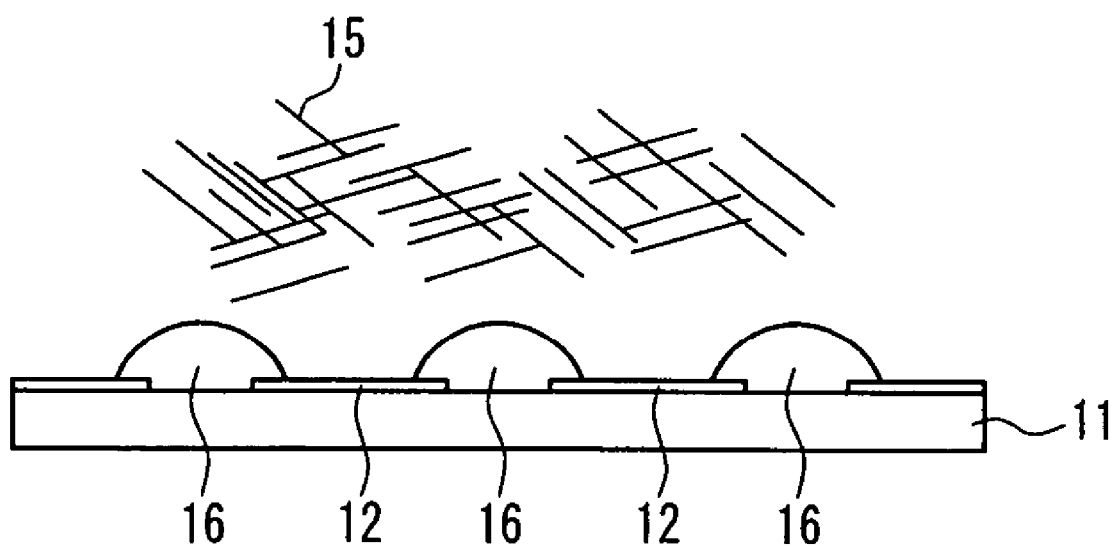
FIG. 11B is a cross-sectional view for describing a step following FIG. 11A.

As a method of introducing the needle-shaped magnetic grains 15, the method shown in FIGS. 11 and 11B may be used. That is, to the resin film 11 after formation of the droplet 16 as shown in FIG. 11A, the needle-shaped magnetic grains 15 are dropped from above as shown in FIG. 11B, and thereby the needle-shaped magnetic grains 15 are introduced in the droplet 16. Alternatively, the needle-shaped magnetic grains 15 are dispersed in the solution of the droplet 16, and that solution also can be used for formation on the resin film 11 of the droplet 16 including the needle-shaped magnetic grains 15.

Note that instead of forming the magnetic stripe 13 by arranging and aggregating the needle-shaped magnetic grains 15 directly on the resin film 11 by the above-described formation method, it is possible to form the magnetic stripe 13 by first orienting and aggregating the needle-shaped magnetic grains 15 on another carrier film, and then by transferring it to the resin film 11.

By laminating, as described above, the magnetic stripe sheet 10 on which is arranged and aggregated in a stripe shape the needle-shaped magnetic grains 15, it is possible to manufacture the RFID magnetic sheet 2 made of the laminated body shown in FIGS. 6A and 6B.

Figure 12A:
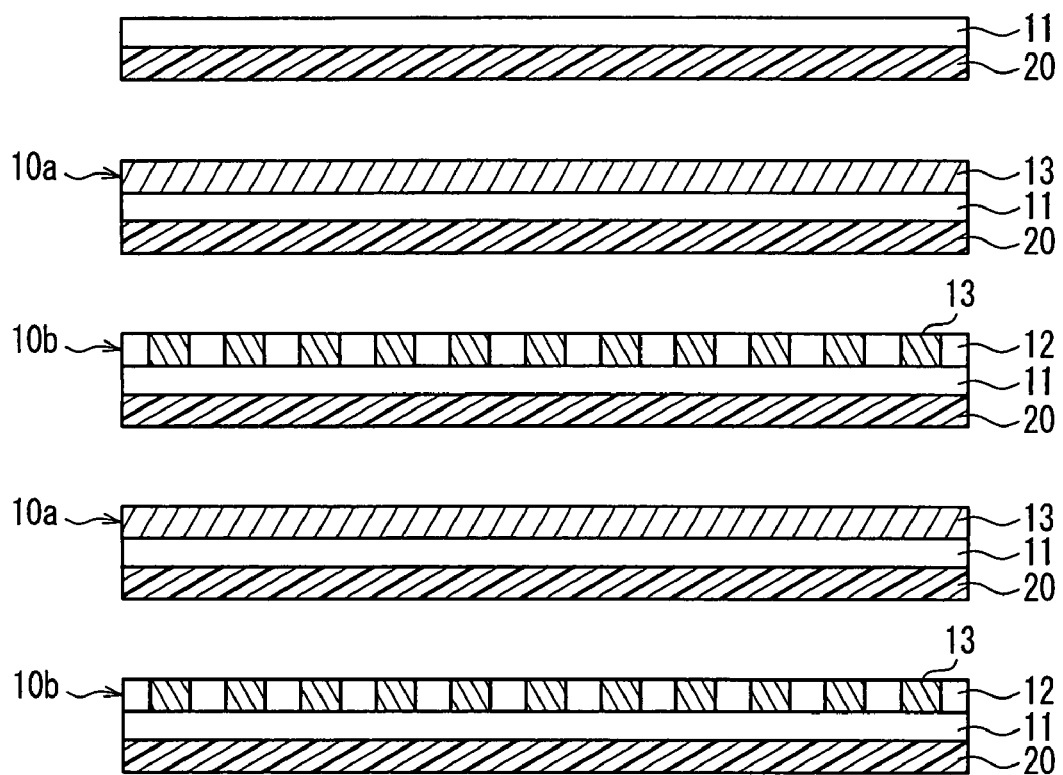
FIG. 12A is a cross-sectional view for describing a step of laminating the magnetic stripe sheet, which is a part of the manufacturing method of the RFID magnetic sheet according to the first embodiment.

Next, the laminating method of the magnetic stripe sheet 10 will be described. First, as shown in FIG. 12A, the magnetic stripe 13 formed on each of the resin films 11 is laminated so as to form a lattice pattern. In FIG. 12A, the magnetic stripe sheet 10a of the row pattern and the magnetic stripe sheet 10b of the column pattern are laminated alternately. Also, an adhesive layer 20 is provided between each resin film 11. The adhesive layer 20 includes, for example, an adhesive agent such as epoxy resin. Note that it is possible to use the resin film 11 with an adhesive function provided to a predetermined surface, without providing an adhesive layer 20.

Figure 12B:
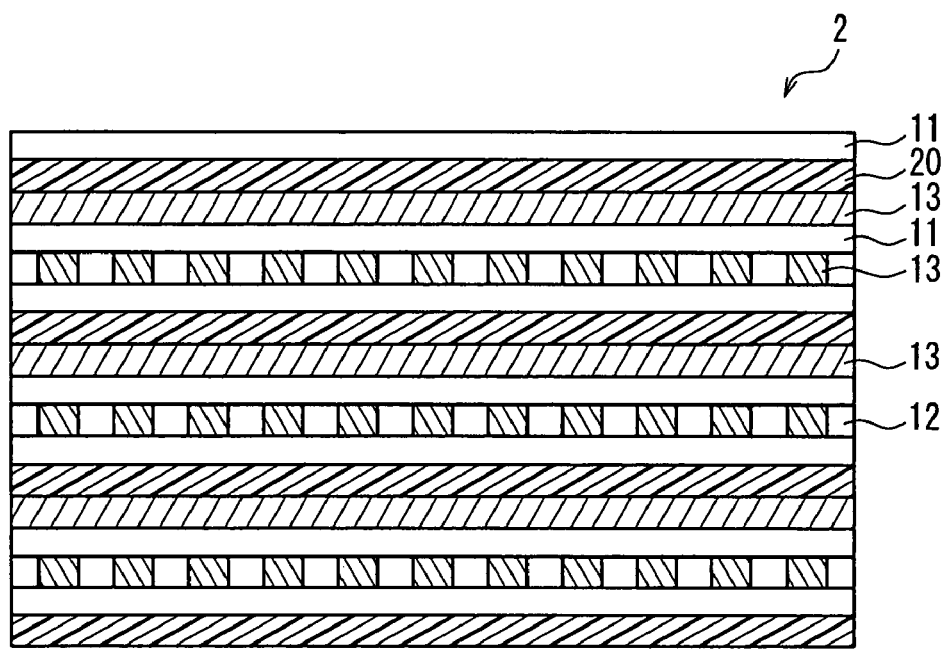
FIG. 12B is a cross-sectional view for describing a step following the step of FIG. 12A.

Then, by executing the laminating step to form the laminated body by attaching each of the resin films 11, the RFID magnetic sheet 2 of the present embodiment is obtained, as shown in FIG. 12B. The number of layers (number of layers of the resin film 11) of the magnetic stripe sheet 10 is determined according to the desired characteristics of the RFID magnetic sheet 2, and, for example, 6 or more layers (10-15 layers as an example) is possible.

Note that it is typical, in a regular manner, to laminate alternately the magnetic stripe sheet 10a of the row pattern and the magnetic stripe sheet 10b of the column pattern, but there are cases in which the magnetic stripe sheets 10a and 10b do not have to be accurately alternated if a lattice pattern is formed when viewing the laminated body from above (laminated direction).

In the RFID magnetic sheet 2 of the present embodiment, each of the plurality of magnetic stripes 13 may not only cross with one another at 90°, but may also cross diagonal to one another. In addition, one of the magnetic stripe 13 may be arranged to be parallel to the rectangular resin film 11, and the other may extend diagonally, so that they intersect at an angle other than 90°.

Figure 13:
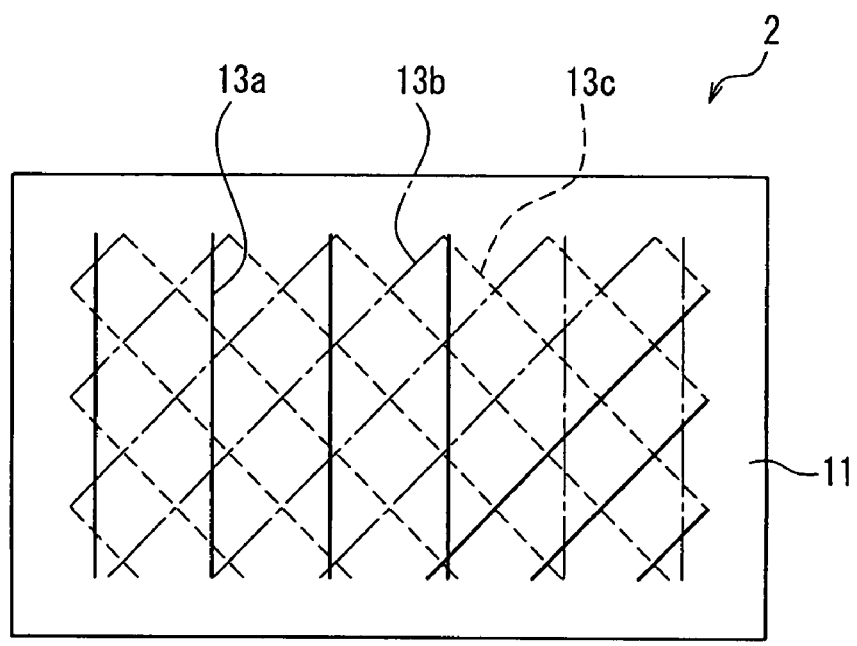
FIG. 13 is a top perspective view showing an alternate example of the RFID magnetic sheet according to the first embodiment.
Figure 14:
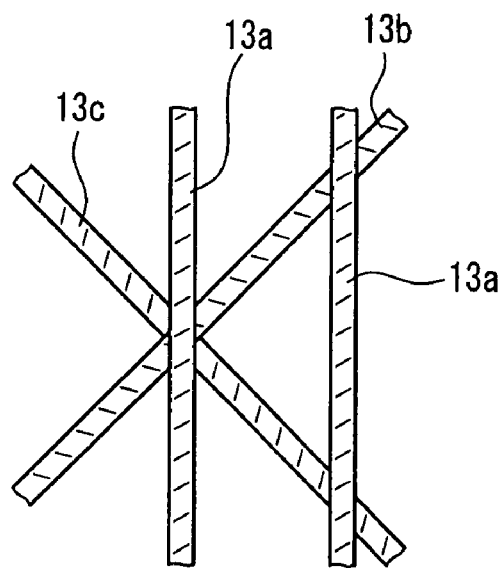
FIG. 14 is a partial enlarged view of the RFID magnetic sheet shown in FIG. 13.

Alternatively, as shown in FIG. 13, the lattice pattern of the RFID magnetic sheet 2 can comprise a magnetic stripe 13a of a pattern extending in a first direction, a magnetic stripe 13b of a pattern extending in a second direction, and a magnetic stripe 13c of a pattern extending in a third direction. FIG. 14 shows the arrangement of the magnetic stripes 13a-13c of this pattern in a schematically enlarged manner.

Note that, in the case of crossing the magnetic stripe sheet 10a of the row pattern and the magnetic stripe sheet 10b of the column pattern, there are cases where it is not necessary to unify the line width of the fine line of the magnetic stripe 13 and the space (interval) for every layer. However, from the point of view of manufacturing process, it is efficient to use a magnetic stripe 13 with the same line and space for each layer.

In the above example of the manufacturing method, the hydrophilic stripe region 14 surrounded by the water-repelling layer 12 is formed by the patterning of the water-repelling layer 12, but it is possible to form the hydrophilic stripe region 14 using other methods. For example, as shown in FIGS. 15A and 15B, it is possible to form the water-repelling/hydrophilic pattern using a photocatalyst.

Figure 15A:
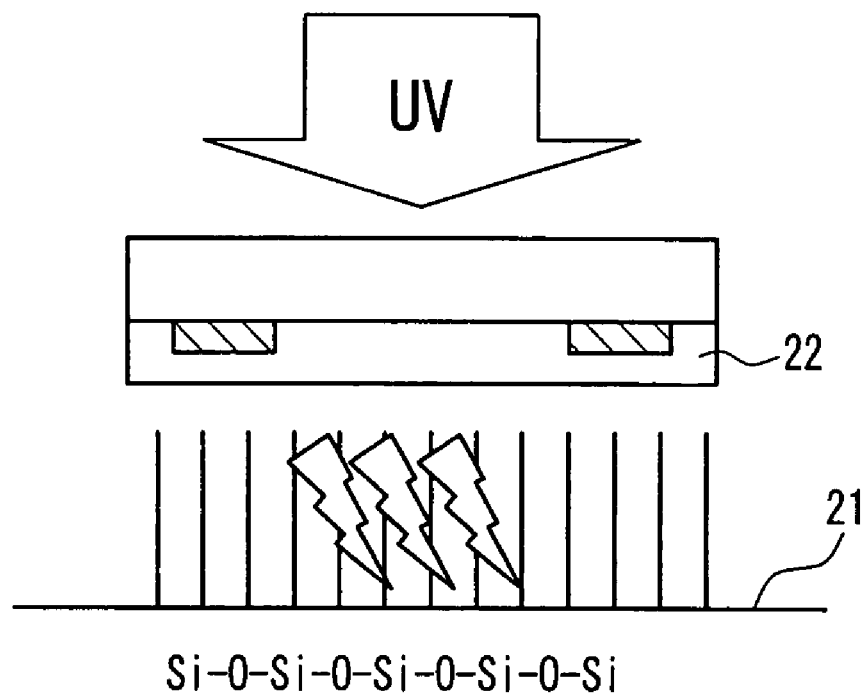
FIG. 15A is a step cross-sectional view for describing another example of the configuration and manufacturing method of the RFID magnetic sheet according to the first embodiment.
Figure 15B:
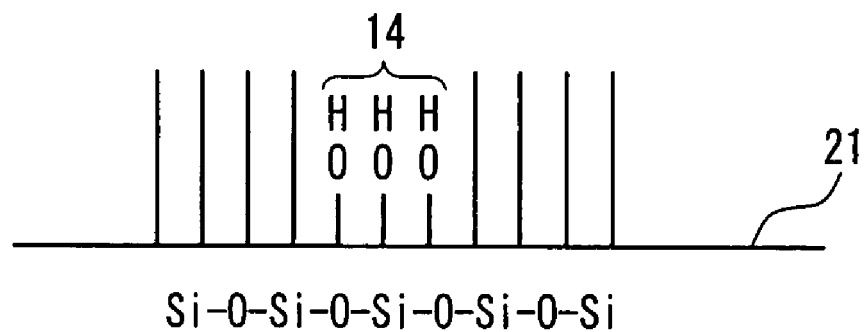
FIG. 15B is a cross-sectional view for describing a step following FIG. 15A.

First, as shown in FIG. 15A, a film on whose surface is formed an organic functional material layer 21 constituted with an organic functional material is prepared. Next, ultraviolet radiation (UV) is irradiated on that film via a mask 22 prescribing the pattern of the hydrophilic stripe region 14. The material constituting this organic functional material layer 21 forms a hydrophilic group by cutting molecular chains with UV irradiation. Therefore, by irradiation with UV, as shown in FIG. 15B, the hydrophilic stripe region 14 corresponding to the pattern of the mask 22 is formed. In this example, a part of the alkyl chain is cut by the reactive oxygen species generated by UV, and by this the hydrophilic region is formed. Note that in the case of forming a hydrophilic stripe region 14 by UV irradiation, it is possible to form the hydrophilic stripe region 14 by irradiating plasma to the predetermined region.

Figure 16:
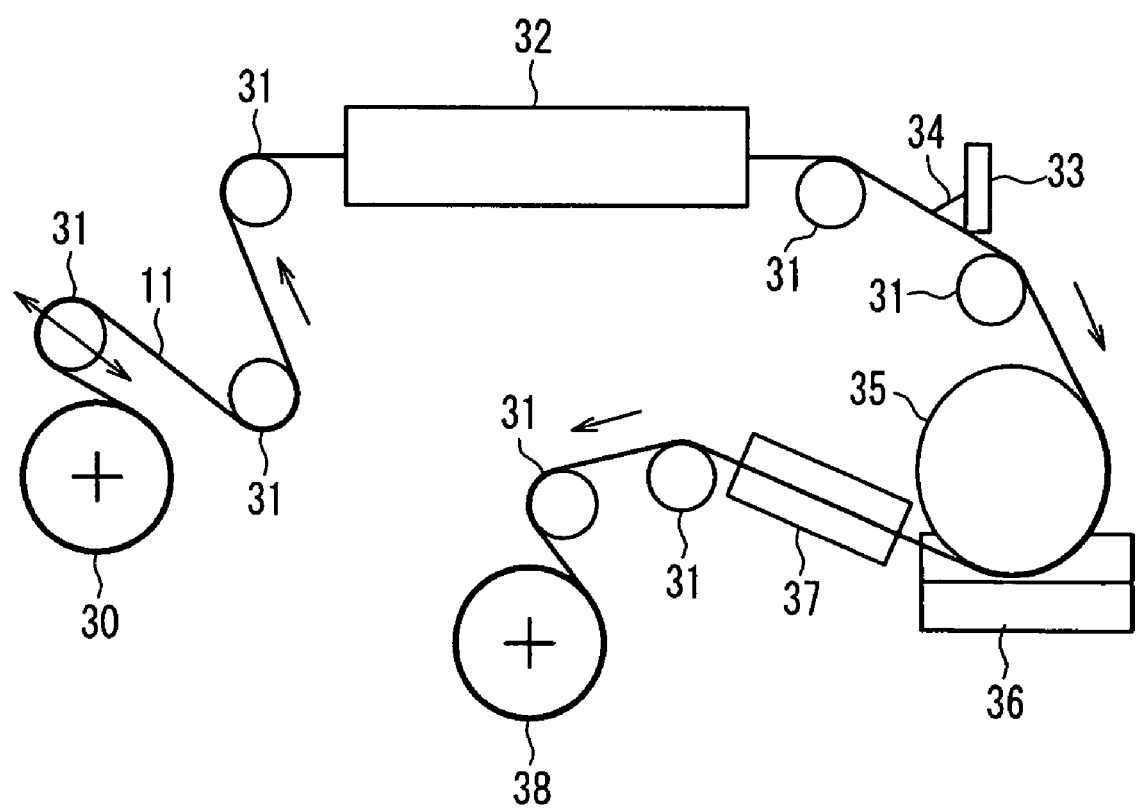
FIG. 16 is a step view for describing a manufacturing method using a roll-to-roll method of the RFID magnetic sheet according to the first embodiment.

In addition, the RFID magnetic sheet 2 of the present embodiment can be manufactured successively by a roll-to-roll method. FIG. 16 shows an example of the case of manufacturing the RFID magnetic sheet 2 using the roll-to-roll method.

The resin film 11 on which is formed the water-repelling layer 12 is wound on a winding roll 30. The resin film 11 pulled out from the winding roll 30 is supported by a plurality of tension rolls 31, and is sent to an exposure unit 32. To the water-repelling layer 12 formed on the resin film 11 sent to the exposure unit 32 is formed, for example, a hydrophobic pattern/hydrophilic pattern by the UV-type exposure unit 32. In the resin film 11 taken out of the exposure unit 32, the stripe region 14 becomes exposed and formed as a result of being washed away by a squeegee 33 and a solution 34. Next, the resin film 11 moves together with the rotation of a roll 35, and is immersed in a solution (suspension liquid) 36 of the needle-shaped magnetic grains. After that, the resin film 11 is dried by passing through a drying unit 37, and the resin film 11 on which is formed the magnetic stripe 13 including the needle-shaped magnetic grains 15 is wound by a winding roll 38. Water and organic binder (polyvinyl alcohol; PVA) are included in the solution (suspension liquid) 36 of the needle-shaped magnetic grains, and the organic binder has the function of fixing the needle-shaped magnetic grains 15 when dried.

Note that a movable tension roll further can be introduced in order to move the resin film 11 forward and backward inside the exposure unit 32. Alternatively, it is possible to make the mask inside the exposure unit 32 to be movable and to form the desired pattern.

Figure 17:
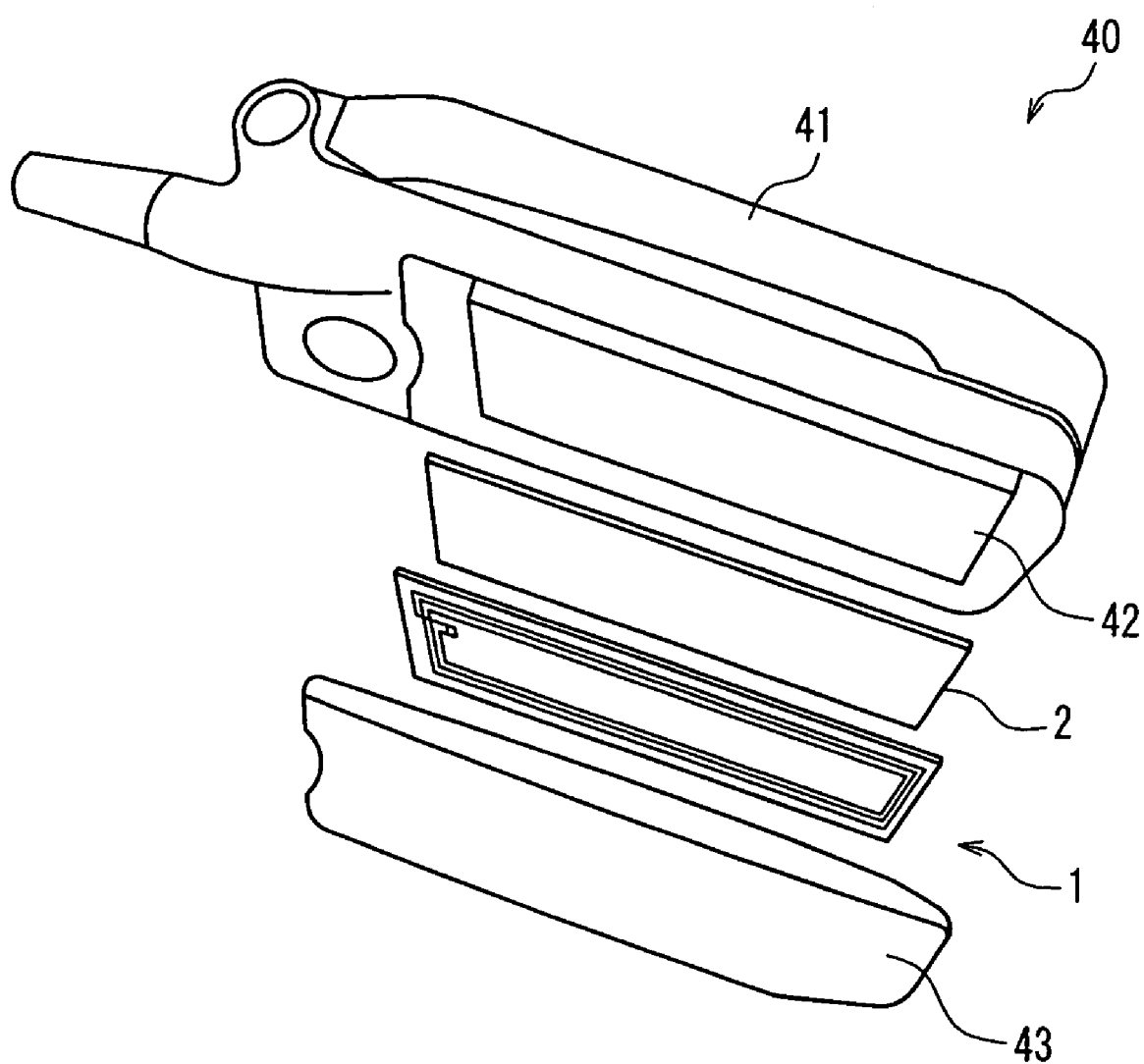
FIG. 17 is an exploded perspective view of a mobile telephone on which is equipped the RFID magnetic sheet according to the first embodiment.

FIG. 17 shows an exploded perspective view showing the configuration of a mobile telephone 40 on which is equipped the RFID magnetic sheet 2 of the present embodiment. On this mobile telephone 40 is provided the RFID magnetic sheet 2 according to the embodiment described above. That is, a main body 41 of the mobile telephone 40 is equipped with a battery pack 42, and an IC tag 1 is provided on that battery pack 42 with the RFID magnetic sheet 2 interposed, and a lid 43 seals the main body 41.

Since the metal battery pack 42 is loaded on the main body 41 of the mobile telephone 40, if no measure is given, the communication state of the IC tag 1 is deteriorated. However, in the present embodiment, the RFID magnetic sheet 2 is provided, so the worsening of the communication state can be repressed. The RFID magnetic sheet 2 has a high magnetic permeability while at the same time being thin and flexible. Therefore, it is easy to realize a thin mobile telephone 40 even if using the lid 43 of the mobile telephone 40 to store the IC tag and the RFID magnetic sheet 2.

The RFID magnetic sheet according to the embodiments of the present invention may be used not only in mobile phones, but also in mobile communication devices such as PDAs. In addition, the RFID magnetic sheet according to the embodiments of the present invention may be used by placing on non-contact type IC cards (or IC tags) even in embodiments that do not involve equipping on mobile communication devices.

In addition, at the laminating step shown in FIGS. 12A and 12B, it is possible to a layer film (resin film), on which is formed a pattern of the RFID antenna coil, on the laminated body of the resin film 11 on which is formed the magnetic stripe 13, and thereby create the IC tag with magnetic sheet. Alternatively, it is possible to form a metal layer (e.g., copper layer) on a laminated body, process that metal layer, and form the pattern of the RFID antenna coil.

The above description related to the present embodiment is not limiting, and various modifications are possible. For example, in the above-described example, the case in which the fine line comprising the magnetic stripe 13 is a straight line was described, but, as long as each fine line does not contact each other, the magnetic stripe 13 may comprise fine lines including curved portions.

The magnetic stripe sheet 10 described in the present embodiment above corresponds to the magnetic sheet with stripe-arranged magnetic grains of the present invention, and the configuration of the magnetic stripe sheet 10 shows one example of the magnetic sheet with stripe-arranged magnetic grains. In addition, by the manufacturing method of the above-described magnetic stripe sheet 10, it easily can be understood that a magnetic sheet with stripe-arranged magnetic grains having a more general configuration can be manufactured.

Second Embodiment

Figure 18:
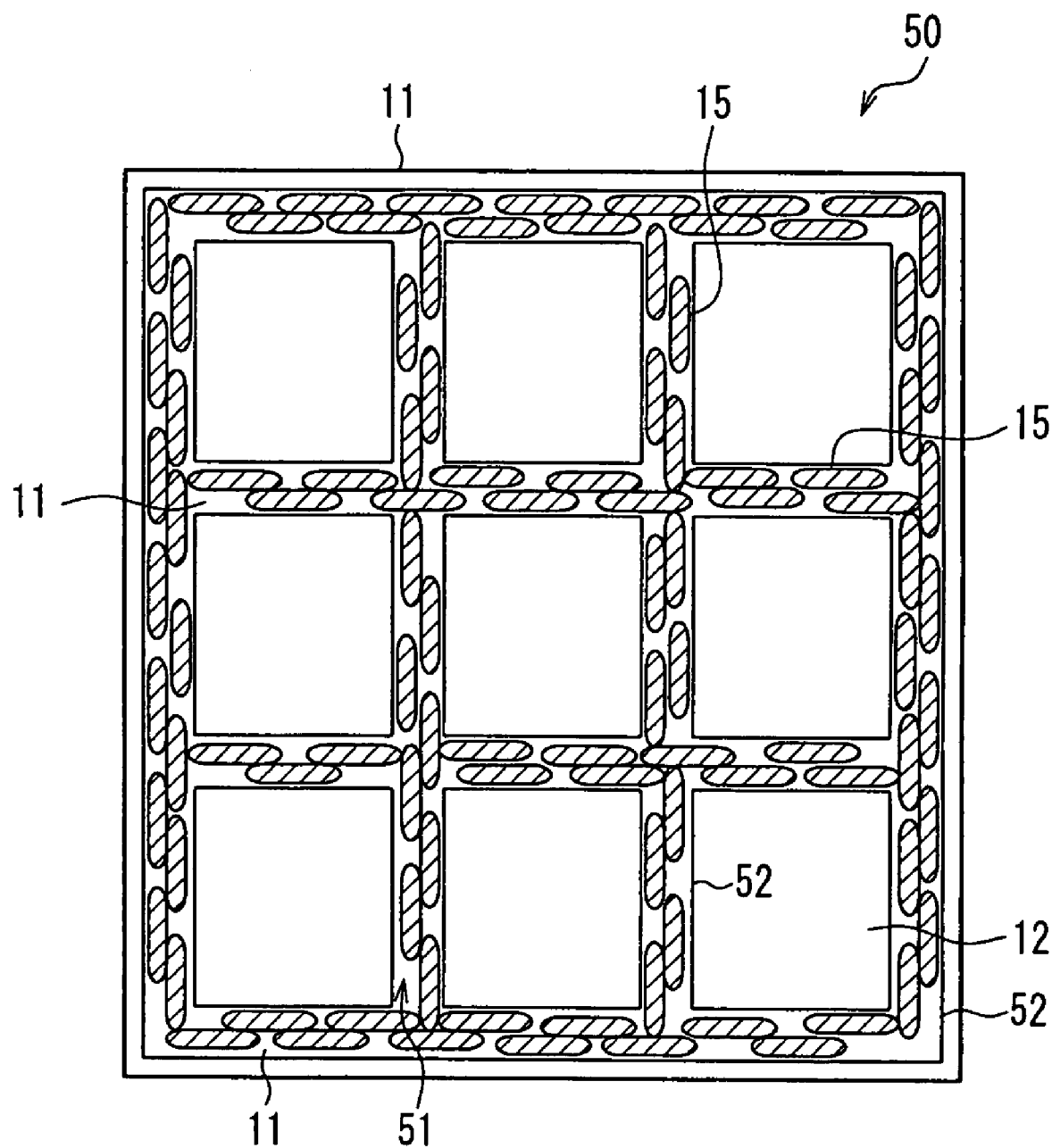
FIG. 18 is a top view schematically showing the configuration of the electromagnetic shielding sheet according to the second embodiment of the present invention.
Figure 19:
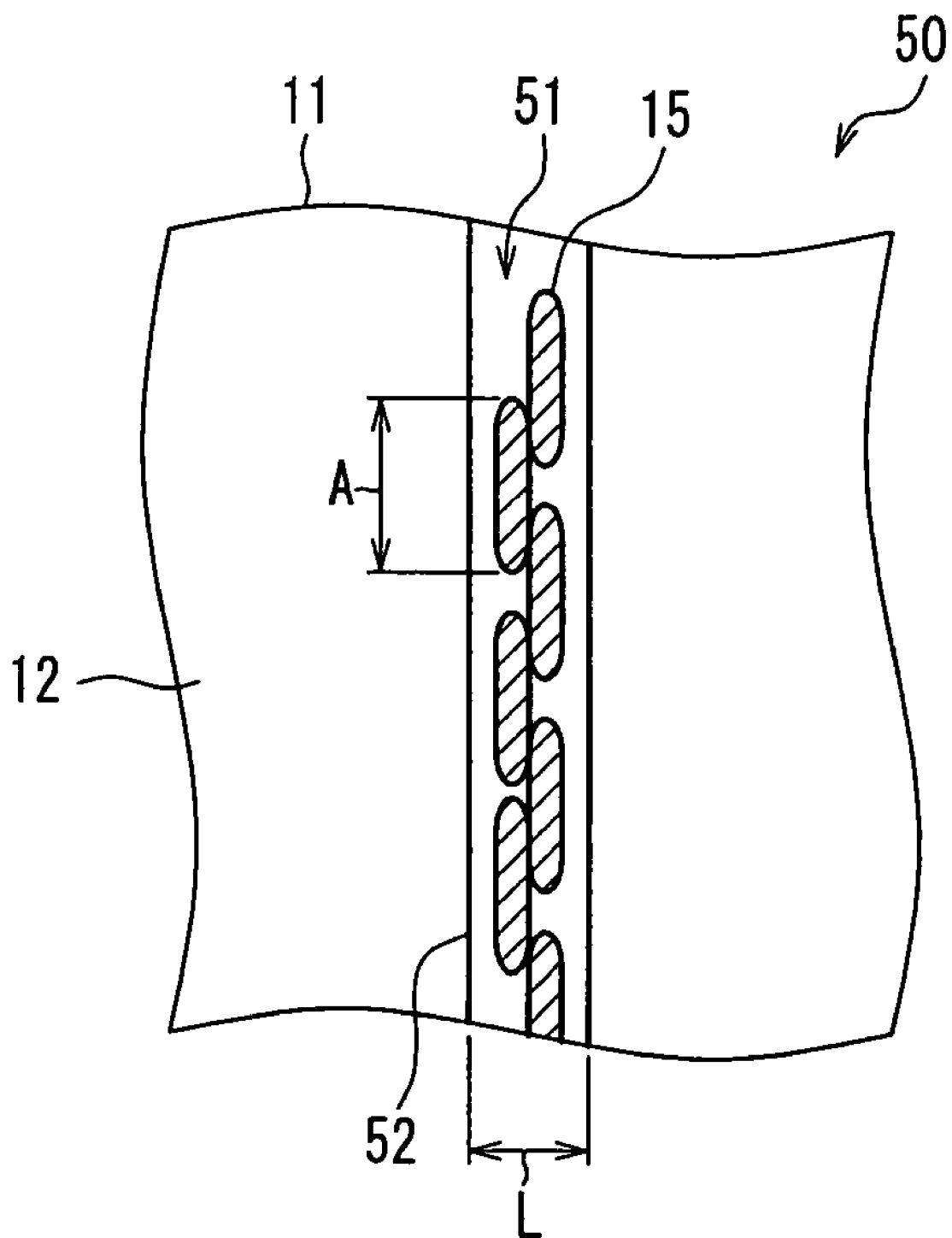
FIG. 19 is a partial enlarged view for describing a sequence state of needle-shaped magnetic grains in the same electromagnetic shielding sheet.

The electromagnetic shielding sheet according to a second embodiment of the present invention will be described with reference to FIG. 18 and FIG. 19. FIG. 18 is a plan view schematically showing the upper surface configuration of an electromagnetic shielding sheet 50 of the present embodiment. FIG. 19 is a plan view showing a partial enlargement of the electromagnetic sheet 50 shown in FIG. 18. The structural elements of the electromagnetic shielding sheet 50 is the same as the magnetic sheet 2 of the first embodiment, and, therefore, identical elements will have the same reference numerals.

The electromagnetic shielding sheet 50 of the present embodiment includes a resin film 11, a water-repelling layer 12 formed on the resin film 11, and a magnetic lattice 51 made of needle-shaped magnetic grains 15 formed in the water-repelling layer 12. In the water-repelling layer 12 is formed a region having a lattice-shaped pattern (lattice region) 52 exposed by the resin film 11 surface due to absence of a water-repelling material in a stripe shape. The magnetic lattice 51 is formed by orienting and aggregating the needle-shaped magnetic grains 15 in that lattice region 52.

The electromagnetic shielding sheet 50 of the present embodiment is intended to be attached to a display, and, specifically, because it is attached to the front surface of the display, it has both electromagnetic wave shielding and transparency characteristics. While the electromagnetic shielding sheet 50 can be used for display apparatuses such as CRT, PDP (plasma display panel), liquid crystal display (LCD), EL, etc., the electromagnetic shielding sheet 50 of the present embodiment is used suitably for flat panel displays such as PDP and LCD. In particular, this shielding is suitable for PDP because the electromagnetic waves may be emitted from the display front panel.

Similarly to the stripe region 14 of the magnetic sheet 2 of the first embodiment, the lattice region 52 of the electromagnetic shielding sheet 50 is a region that is relatively hydrophilic against the water-repelling property of the water-repelling layer 12. The needle-shaped magnetic grains 15 are oriented and aggregated on the hydrophilic lattice region 52 by the effect of surface tension at the manufacturing step. As shown in FIG. 19, it is desirable for the orientation and aggregation of the needle-shaped magnetic grains 15 that the width L of the hydrophilic lattice region 52 is narrower than the length A in the length direction of the needle-shaped magnetic grains 15. Note that, as shown schematically, the needle-shaped magnetic grains 15 of the present embodiment are oriented so that the length direction of the needle-shaped magnetic grains 15 is aligned with the length direction of the stripe pattern (strip) comprising the lattice region 52.

The length A of the length direction of the magnetic grains 15 may be, for example, 100 μm or greater (50 μm-200 μm can be given as one example). The length A of the length direction of the needle-shaped magnetic grains 15 may be the average value (the average crystal particle diameter in the length direction) of the plurality of needle-shaped magnetic grains 15. Therefore, it may be the case that there exist individual needle-shaped magnetic grains 15 that have a length A of the length direction of the needle-shaped magnetic grains 15 being shorter than the width L of the hydrophilic lattice region 52.

The width L of the lattice region 52 (fine line) may be determined as desired depending on the type of the needle-shaped magnetic grains 15 to be used, and on the pixel design of the applicable flat panel display (e.g., PDP), and is, for example, 0.5 mm or less (50 μm-300 μm can be given as one example). The dimensions of the water-repelling layer 12 between the lattice regions 52 (fine lines) basically may be determined to correspond to the pixels of the flat panel display (e.g., PDP).

The needle-shaped magnetic grains 15 of the present embodiment may be of an anisotropic soft magnetic material. Such a material may be iron metal magnetic grains, and more specifically, needle-shaped metal powder such as Fe, Fe—Al—Si, and Fe—Ni may be used. In addition, the needle-shaped magnetic grains 15 may be a magnetic grain that includes at least one of the elements selected from the group consisting of Fe, Ni, and Co (e.g., an alloy including these elements). Alternatively, perovskite oxide magnetic powder (ferrite magnetic material) including Fe and Sr, Ni, or Co may be used. Here, as the needle-shaped magnetic grains 51, an example of using Fe—Ni metal magnetic powder (needle-shaped crystals of particle diameter 10 μm-20 μm, particle length 50 μm-100 μm) will be described.

The resin film 11 is determined as appropriate based on use, performance and conditions. For example, polyethylene terephthalate resin film (PET resin film), aramid resin film, polyimide resin film, and polyethylene naphthalate resin film can be used. In the present embodiment, the case of using translucent PET film as the resin film 11 will be described. The thickness of the resin film 11 is selected in consideration of translucency and strength, and, for example, is 150 μm or less (25-100 μm as one example).

Note that the magnetic lattice 51 shown in the figure is formed on the resin film 11, but it is possible to arrange other layers (e.g., adhesive layer or sticky layer) on the resin film 11 or on the water-repelling layer 12 and/or the magnetic lattice 51. Also, it is possible to provide the magnetic lattice 51 inside the resin film 11 by using the other layers.

In the electromagnetic shielding sheet 50 of the present invention, the hydrophilic lattice region 52 is formed so as to be exposed from the water-repelling layer 12 formed on the resin film 11, and the needle-shaped magnetic grains 15 are oriented and aggregated in that lattice region 52. Electromagnetic wave shielding of the display can be performed by the magnetic lattice 51, which is a mesh of oriented needle-shaped magnetic grains 15. In the case where the needle-shaped magnetic grain 15 is an anisotropic soft-magnetic, material, it exhibits good electromagnetic wave shielding having a high magnetic permeability, so that it is possible to obtain an electromagnetic wave shielding film especially preferable for the front surface of a PDP panel. The lattice region 52 is a region that is relatively hydrophilic with respect to the water-repelling layer 12, so that the desired state of the arrangement of the needle-shaped magnetic grains 15 can be obtained by aggregating the needle-shaped magnetic grains 15 to the hydrophilic region by surface tension effect in the manufacturing step. By using surface tension, the arrangement of the needle-shaped magnetic grains 15 can be carried out by self-alignment due to the effect of surface tension, without using the manufacturing device for controlling each particle of the magnetic grains.

The electromagnetic shielding sheet 50 has the characteristic of sufficiently shielding electromagnetic waves generated from PDP and the like, as well as remarkably good light transmittance property, by using a fine needle-shaped magnetic grains. The electromagnetic wave shielding effect of the electromagnetic shielding sheet 50 of the present embodiment can effect the reduction of the electromagnetic radiation from PDP by 20 dB or more. A performance of light transmittance of nearly 80% can be obtained.

As a manufacturing method of the electromagnetic shielding sheet 50 of the present embodiment, a method similar to the manufacturing method of the RFID magnetic sheet 2 in the first embodiment can be used. That is, in order to manufacture the electromagnetic shielding sheet 50, it is possible to apply the steps shown in FIGS. 8A through 8D for manufacturing the magnetic stripe sheet. This is because the method is common for manufacturing a sheet on which magnetic grains are arranged.

However, in the step of forming a hydrophilic region surrounded by a water-repelling layer 12 on the resin film 11 shown in FIG. 8A, a hydrophilic lattice region 52 is formed instead of the stripe region 14. That is, the pattern (here, a rectangular pattern) of the water-repelling layer 12 is formed except for the hydrophilic lattice region 52 that is the droplet forming region.

Therefore, when the needle-shaped magnetic grains 15 are introduced to the droplet 16 (solution) formed on the hydrophilic region 22 surrounded by the water-repelling layer 12, in the state shown in FIG. 8C, the needle-shaped magnetic grains 15 are arranged in the hydrophilic lattice region and a magnetic lattice mesh is formed.

In the electromagnetic shielding sheet 50 of the present embodiment, the intersection point between the vertical and horizontal lines of the lattice region 52 causes a state that the needle-shaped magnetic grains 15 intersect with each other, and so an eddy current is generated due to electrical continuity due to contact of each of the magnetic grains, thereby being consumed as heat energy at the intersecting part, which is effective in terms of electromagnetic shielding characteristics.

The needle-shaped magnetic grains 15A may be provided with a metal having high electrical conductivity formed on the surface thereof. By plating copper, nickel, silver, etc., which have high electrical conductivity, an even better electromagnetic shielding effect can be obtained because of an electromagnetic shielding effect of the needle-shaped magnetic grains 15 and heat energy conversion of electromagnetic radiation energy due to generation of an eddy current by contact between needle-shaped magnetic grains.

Note that, as in the first embodiment, the formation of the droplet 16 shown in FIG. 8B can be as described with reference to FIG. 10 instead of dispersal as a mist by a spray. Also, as in the first embodiment, the introduction method of the needle-shaped magnetic grains 15 can be as described with reference to FIGS. 11A and 11B.

In addition, instead of forming the magnetic lattice 51 by aggregating the needle-shaped magnetic grains 15 in a lattice arrangement directly on the resin film 11, it is possible to form the magnetic lattice 51 by first orienting and aggregating the needle-shaped magnetic grains 15 on another carrier film, and then transferring it to the resin film 11.

In addition, in the above-described example, the hydrophilic lattice region 52 surrounded by the water-repelling layer 12 is formed by the patterning of the water-repelling layer 12. However, without limiting to only this example, it is possible, as in the first embodiment, to form a water-repelling/hydrophilic pattern using a photocatalyst as described with reference to FIGS. 15A and 15B.

In addition, as in the first embodiment, the electromagnetic shielding sheet 50 of the present embodiment also can be successively manufactured by the roll-to-roll method as described with reference to FIG. 16. By manufacturing the electromagnetic shielding sheet 50 using the roll-to-roll method, a large size of sheets can be successively and rapidly produced, leading to a large reduction in costs.

The description given above relating to the present embodiment is not limiting, and various modifications are possible. For example, in the above-described example, the thin line comprising the lattice region 52 is a straight line, and the water-repelling layer 12 is rectangular, but it is possible to create an electromagnetic shielding sheet of another form based on the electromagnetic shielding characteristics of a mesh including the needle-shaped magnetic grains, if the pixel design of the display is not influenced by the electromagnetic shielding sheet.

Moreover, in addition to the electromagnetic shielding sheet 50 according to the present embodiment, a transparent conductive film may be formed on the entire surface. The transparent conductive film may be preformed on the resin film, or it can be provided after formation of the electromagnetic shielding sheet 50.

Further, an antireflection coating may be combined with the electromagnetic shielding sheet 50 according to the present embodiment.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magnetic sheet with stripe-arranged magnetic grains, comprising:
   a resin film;
   a water-repelling layer formed on the resin film;
   a hydrophilic stripe pattern region that is arranged in a surface region of the water-repelling layer and is relatively hydrophilic with respect to water repellency of the water-repelling layer; and
   a magnetic stripe pattern formed of needle-shaped magnetic grains oriented and aggregated on a hydrophilic material only in an area of the hydrophilic stripe pattern region,
   wherein a width of the stripe pattern region is narrower than a length in the longitudinal direction of the needle-shaped magnetic grain.

2. The magnetic sheet with stripe-arranged magnetic grains according to claim 1, wherein the hydrophilic stripe pattern region is a region where the water-repelling layer is absent to form a stripe state in a planar shape.

3. The magnetic sheet with stripe-arranged magnetic grains according to claim 1, wherein the needle-shaped magnetic grains are fixed in a state in which the needle-shaped magnetic grains are aggregated in the hydrophilic stripe pattern region by the effect of surface tension.

4. The magnetic sheet with stripe-arranged magnetic grains according to claim 1, wherein the needle-shaped magnetic grain is made from an anisotropic soft magnetic metal material.

5. The magnetic sheet with stripe-arranged magnetic grains according to claim 4, wherein the needle-shaped magnetic grain is made from an alloy including at least one element selected from the group consisting of Fe, Ni, and Co.

6. The magnetic sheet with stripe-arranged magnetic grains according to claim 1, wherein the magnetic stripe pattern comprises the needle-shaped magnetic grains and an organic binder.

7. The magnetic sheet with stripe-arranged magnetic grains according to claim 1, wherein the resin film is aramid resin or polyimide resin.

8. An RFID (Radio Frequency Identification) magnetic sheet used in a RFID system, comprising:
   a plurality of laminated resin films;
   a water-repelling layer formed on each of the resin films;
   a hydrophilic stripe pattern region that is arranged in a surface region of the water-repelling layer and is relatively hydrophilic with respect to water repellency of the water-repelling layer; and
   a magnetic stripe pattern formed of needle-shaped magnetic grains oriented and aggregated on a hydrophilic material only in an area of the hydrophilic stripe pattern region;
   wherein a width of the stripe pattern region is narrower than a length in the longitudinal direction of the needle-shaped magnetic grain;
   a plurality of the magnetic stripe patterns are formed on each of the resin films so as to be isolated from one another; and
   the magnetic stripe pattern on each of the resin films is arranged such that each pattern mutually intersects, in a planar shape, with the magnetic stripe pattern on the other resin film.

9. The RFID magnetic sheet according to claim 8, wherein a lattice pattern is formed with the magnetic stripe patterns extending along a first direction and the magnetic stripe patterns extending along a second direction, which are formed on the respective resin films of layers different from one another.

10. The RFID magnetic sheet according to claim 9, further comprising a resin film on which is formed a magnetic stripe pattern extending along a third direction that differs from the first and second directions.

11. A non-contact type IC card, comprising:
    the RFID magnetic sheet according to claim 8;
    an antenna coil for RFID use, arranged adjacent to the RFID magnetic sheet; and
    an IC chip connected to the antenna coil for RFID use.

12. A mobile communication apparatus comprising:
    the RFID magnetic sheet according to claim 8;
    an antenna coil for RFID use, arranged adjacent to the RFID magnetic sheet; and
    an IC ship connected to the antenna coil for RFID use.

13. An electromagnetic shielding sheet to be attached to a display, comprising:
    a resin film;
    a water-repelling layer formed on the resin film;
    a hydrophilic stripe pattern region that is arranged in a surface region of the water-repelling layer and is relatively hydrophilic with respect to water repellency of the water-repelling layer; and
    a magnetic stripe pattern formed of needle-shaped magnetic grains oriented and aggregated on a hydrophilic material only in an area of the hydrophilic stripe pattern region, wherein a width of the stripe pattern region is narrower than a length in the longitudinal direction of the needle-shaped magnetic grain, the stripe pattern region is a lattice-shaped pattern region formed into a lattice shape, and a magnetic lattice-shaped pattern is formed of the needle-shaped magnetic grains oriented and aggregated in the lattice-shaped pattern region.

14. The electromagnetic shielding sheet according to claim 13, wherein the needle-shaped magnetic grain is an iron metal magnetic grain or a ferrite magnetic grain.

15. The electromagnetic shielding sheet according to claim 13, wherein the resin film is made of translucent resin.

16. A flat panel display in which the electromagnetic shielding sheet according to claim 13 is attached to the front face of a display panel.

17. The flat panel display according to claim 16, wherein the display panel is a plasma display panel.

18. A method of manufacturing a magnetic sheet with stripe-arranged magnetic grains, comprising:

a step (a) of forming, on a resin film, a water-repelling layer, and a hydrophilic stripe pattern region that is positioned within a surface region of the water-repelling layer and is relatively hydrophilic with respect to water repellency of the water-repelling layer; and a step (b) of providing a solution containing the needle-shaped magnetic grains to the hydrophilic stripe pattern region to form a magnetic stripe pattern of needle-shaped magnetic grains oriented and aggregated on a hydrophilic material only in an area of the hydrophilic stripe pattern region, wherein a width of the stripe pattern region is narrower than a length in the longitudinal direction of the needle-shaped magnetic grain.

19. The method of manufacturing a magnetic sheet with stripe-arranged magnetic grains according to claim 18, wherein the hydrophilic stripe pattern region is a region where the resin film is exposed so as to be surrounded by the water-repelling layer.

20. The method of manufacturing a magnetic sheet with stripe-arranged magnetic grains according to claim 18, wherein the step (a) includes a step of forming, on the resin film, a water-repelling layer having a water-repellent property against the solution in the step (b); and a step of forming the hydrophilic stripe pattern region by exposing the water-repelling layer by using a mask defining the stripe pattern region.

21. The method of manufacturing a magnetic sheet with stripe-arranged magnetic grains according to claim 18, wherein the step (a) includes a step of forming the hydrophilic stripe pattern region by exposing, using a mask defining the stripe patter region, a film having a surface that is changeable to be hydrophilic with an exposure.

22. The method of manufacturing a magnetic sheet with stripe-arranged magnetic grains according to claim 18, wherein the step (b) includes a step of providing a solution on top of the resin film on which the hydrophilic stripe pattern region has been formed; and a step of introducing the needle-shaped magnetic grains to the solution provided on the resin film.

23. The method of manufacturing a magnetic sheet with stripe-arranged magnetic grains according to claim 18, wherein the step (b) includes a step of dispersing the needle-shaped magnetic grains in the solution; and a step of applying, on the resin film, the solution in which the needle-shaped magnetic grains have been dispersed.

24. The method of manufacturing a magnetic sheet with stripe-arranged magnetic grains according to claim 18, wherein the step (b), the needle-shaped magnetic grains are arranged in the hydrophilic stripe pattern region by surface tension of the solution.

25. The method of manufacturing a magnetic sheet with stripe-arranged magnetic grains according to claim 18, comprising a step of transferring to another film the magnetic stripe pattern after the step (b).

26. The method of manufacturing a magnetic sheet with stripe-arranged magnetic grains according to claim 18, wherein the steps (a) and (b) are successively executed in a roll to roll method.

27. A method of manufacturing a RFID magnetic sheet, comprising:

a step (a) of forming, on resin film, a water-repelling layer and a hydrophilic stripe pattern region that is positioned within a surface region of the water-repelling layer and is relatively hydrophilic with respect to water repellency of the water-repelling layer;

a step (b) of providing a solution containing needle-shaped magnetic grains to the hydrophilic stripe pattern region formed on the resin film to form a magnetic stripe pattern by orienting and aggregating the needle-shaped magnetic grains on a hydrophilic material only in an area of the hydrophilic stripe pattern region; and a step (c) of laminating the resin film on which the magnetic stripe pattern has been formed, wherein in the step (a), a plurality of the hydrophilic stripe pattern regions are formed such that each is isolated from one another;

in the step (c), the magnetic stripe pattern on each of the resin films is arranged such that each pattern mutually intersects, in a planner shape, with the magnetic stripe pattern on the other resin films, and a width of the stripe pattern region is narrower than a length in the longitudinal direction of the needle-shaped magnetic grain.

28. The method of manufacturing a RFID magnetic sheet according to claim 27, wherein in a planar shape of a laminated body of the resin films, the laminated body is formed such that a lattice pattern is formed with the magnetic stripe pattern extending along a first direction and the magnetic stripe pattern extending along a second direction.

29. A method of manufacturing an electromagnetic shielding sheet, comprising:

a step (a) of forming, on a resin film, a water-repelling layer and a hydrophilic stripe pattern region that is positioned within a surface region of the water-repelling layer and is relatively hydrophilic with respect to water repellency of the water-repelling layer; and a step (b) of providing a solution containing needle-shaped magnetic grains to the hydrophilic stripe pattern region formed on the resin film to form a magnetic strip pattern by orienting and aggregating the needle-shaped magnetic grains on a hydrophilic material only in an area of the hydrophilic stripe pattern region, wherein in the step (a), the stripe pattern region is formed into a lattice shape, in the step (b), the magnetic lattice-shaped pattern is formed by orienting and aggregating the needle-shaped magnetic grains in the lattice-shaped stripe pattern region, and a width of the stripe pattern region is narrower than a length in the longitudinal direction of the needle-shaped magnetic grain.

* * * * *

UNITED STATES PATENT AND TRADEMARK OFFICE
CERTIFICATE OF CORRECTION

| | |
|---|---|
| PATENT NO. | : 7,981,528 B2 |
| APPLICATION NO. | : 11/848407 |
| DATED | : July 19, 2011 |
| INVENTOR(S) | : Nakatani et al. |

It is certified that error appears in the above-identified patent and that said Letters Patent is hereby corrected as shown below:

Column 21, line 50 (claim 21): "patter region" should read --pattern region--.
Column 22, line 33 (claim 27): "planner" should read --planar--.

Signed and Sealed this
Fourteenth Day of February, 2012

David J. Kappos
*Director of the United States Patent and Trademark Office*